(12) United States Patent
Everman et al.

(10) Patent No.: US 11,882,237 B1
(45) Date of Patent: Jan. 23, 2024

(54) APPARATUS AND METHODS FOR MONITORING HUMAN TRUSTWORTHINESS

(71) Applicant: GMECI, LLC, Beavercreek, OH (US)

(72) Inventors: Bradford R Everman, Haddonfield, NJ (US); Brian Bradke, Brookfield, VT (US)

(*) Notice: Subject to any disclaimer, the term of this patent is extended or adjusted under 35 U.S.C. 154(b) by 0 days.

(21) Appl. No.: 18/072,446

(22) Filed: Nov. 30, 2022

(51) Int. Cl.
| | |
|---|---|
| *H04W 12/06* | (2021.01) |
| *H04M 3/22* | (2006.01) |
| *G10L 25/27* | (2013.01) |
| *G10L 25/51* | (2013.01) |

(52) U.S. Cl.
CPC ......... *H04M 3/2281* (2013.01); *G10L 25/27* (2013.01); *G10L 25/51* (2013.01)

(58) Field of Classification Search
CPC ....... H04M 3/2281; G10L 25/27; G10L 25/51
See application file for complete search history.

(56) References Cited

U.S. PATENT DOCUMENTS

| | | | |
|---|---|---|---|
| 9,070,088 B1 * | 6/2015 | Baveja | G06N 20/00 |
| 9,808,185 B2 | 11/2017 | Arnold | |
| 11,382,510 B2 | 7/2022 | Khare | |
| 2012/0245439 A1 | 9/2012 | Andre | |
| 2019/0080698 A1 * | 3/2019 | Miller | G06F 21/32 |
| 2019/0298242 A1 * | 10/2019 | Jungmann | A61B 5/486 |
| 2020/0160870 A1 * | 5/2020 | Baughman | G10L 15/30 |
| 2021/0221404 A1 * | 7/2021 | Reiner | G06V 20/597 |
| 2023/0041272 A1 * | 2/2023 | Ayllón Álvarez | G09B 19/04 |
| 2023/0080048 A1 * | 3/2023 | Mohiuddin | G16H 50/80 |
| | | | 702/19 |
| 2023/0144166 A1 * | 5/2023 | Alford | G06N 5/022 |
| | | | 706/12 |

* cited by examiner

*Primary Examiner* — Dai Phuong
(74) *Attorney, Agent, or Firm* — Caldwell Intellectual Property Law

(57) ABSTRACT

Aspects relate to an apparatus and methods for monitoring human trustworthiness. The apparatus includes at least an interface configured to facilitate telecommunication for a participant, a plurality of sensors configured to detect a plurality of signals from the participant, at least a computing device comprising at least a processor, and a memory communicatively connected to the at least a processor, wherein the memory contains instructions configuring the at least a processor to receive a plurality of signals from the plurality of sensors, generate a participant trustworthiness classifier as a function of a participant trustworthiness machine-learning algorithm, train the participant trustworthiness classifier using at least a training sample, wherein the at least a training sample correlates the plurality of signals to responses of known trustworthiness, and determine a participant trustworthiness as a function of the participant trustworthiness classifier.

18 Claims, 13 Drawing Sheets

US 11,882,237 B1

APPARATUS AND METHODS FOR MONITORING HUMAN TRUSTWORTHINESS

FIELD OF THE INVENTION

The present invention generally relates to the field of monitoring the trustworthiness of an individual. In particular, the present invention is directed to providing monitoring of a participant's trustworthiness in a teleconference based on a real-time metric.

BACKGROUND

A teleconference is a live audio and/or audiovisual meetings between two or more participants. It is becoming one of the most popular virtual telecommunication channels. However, lack of trust among participants is very concerning.

SUMMARY OF THE DISCLOSURE

In an aspect an apparatus for monitoring human trustworthiness is disclosed. The apparatus includes at least an interface configured to facilitate telecommunication for a participant, a plurality of sensors configured to detect a plurality of signals from the participant, at least a computing device comprising at least a processor, and a memory communicatively connected to the at least a processor, wherein the memory contains instructions configuring the at least a processor to receive a plurality of signals, generate a participant trustworthiness classifier as a function of a participant trustworthiness machine-learning algorithm, train the participant trustworthiness classifier using at least a training sample, wherein the at least a training sample correlates the plurality of signals to responses of known trustworthiness, and generate a participant trustworthiness as a function of the participant trustworthiness classifier.

In another aspect, a method for monitoring human trustworthiness is disclosed. The method includes facilitating, by at least an interface, telecommunication for a participant, detecting, by a plurality of sensors, a plurality of signals from the participant, receiving, by at least a processor, the plurality of signals, generating, by the at least a processor, a participant trustworthiness classifier as a function of a participant trustworthiness machine-learning algorithm, training, by the at least a processor, the participant trustworthiness classifier using at least a training sample, wherein the at least a training sample correlates the plurality of signals to responses of known trustworthiness, and generating, by the at least a processor, a participant trustworthiness as a function of the participant trustworthiness classifier.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for monitoring human trustworthiness based on a plurality of signals and/or feedbacks detected by a plurality of sensors. In an embodiment, the plurality of sensors may include a near-infrared (NIR) spectroscopy sensor, an exhalation sensor, an inhalation sensor, a cutaneous sensor, a speech sensor, and an eye movement sensor.

Aspects of the present disclosure are directed to provide a real-time metric correlated to the trustworthiness of a participant in a telecommunication (e.g., Zoom, Team, and the like).

Aspects of the present disclosure are also directed to an automated assessment of the participant's trustworthiness using a machine-learning process without the need of an expert's input or additional third-party inputs. In one embodiment, the machine-learning process may be trained using the participant's biometrics (e.g., circulatory, respiratory, cutaneous parameters, and the like.) In one embodiment, the machine-learning process may be trained using biometrics from the participant's interlocutor. In one embodiment, the machine-learning process may be trained using what can be seen and heard in the telecommunication. In one embodiment, the machine-learning process may be trained in accordance with responses to questions with known correct/incorrect answers provided by the participant. Exemplary embodiments illustrating aspects of the present disclosure are described below in the context of several specific examples.

Figure 1:
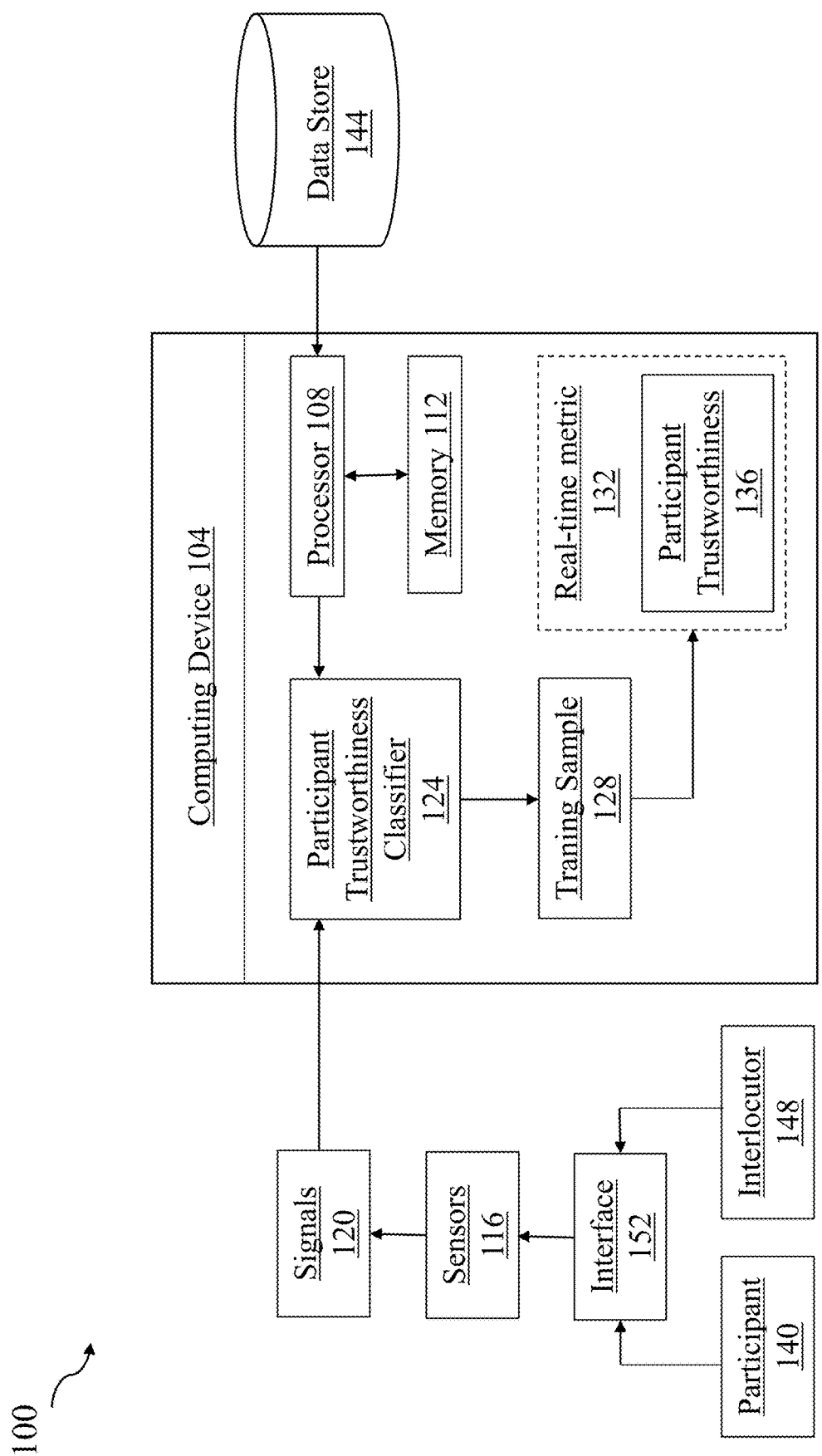
FIG. 1 is a block diagram illustrating an apparatus for monitoring human trustworthiness.

Referring now to FIG. 1, an exemplary embodiment of an apparatus 100 for monitoring human trustworthiness is illustrated. A "trustworthiness," as used in this disclosure, is a level of a human's ability to be relied on as honest or truthful in a telecommunication. Apparatus 100 includes at least a computing device 104. Computing device 104 may include any computing device as described in this disclosure, including without limitation a microcontroller, microprocessor, digital signal processor (DSP) and/or system on a chip (SoC) as described in this disclosure. Computing device 104 includes at least a processor 108 and a memory 112 communicatively connected to processor 108, wherein memory 112 contains instructions configuring processor 108 to carry out a plurality of process for monitoring human trustworthiness. In one embodiment, computing device 104 may include, be included in, and/or communicate with a mobile device such as a mobile telephone or smartphone. Processor 108 may include a single computing device operating independently, or may include two or more computing device operating in concert, in parallel, sequentially or the like; two or more computing devices may be included together in a single computing device or in two or more computing devices. Processor 108 may interface or communicate with one or more additional devices as described below in further detail via a network interface device. Network interface device may be utilized for connecting processor 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software and the like.) may be communicated to and/or from a computer and/or a computing device. Processor 108 may include but is not limited to, for example, a computing device or cluster of computing devices in a first location and a second computing device or cluster of computing devices in a second location. Processor 108 may include one or more computing devices dedicated to data storage, security, distribution of traffic for load balancing, and the like. Processor 108 may distribute one or more computing tasks as described below across a plurality of computing devices of computing device, which may operate in parallel, in series, redundantly, or in any other manner used for distribution of tasks or memory between computing devices. Processor 108 may be implemented using a "shared nothing" architecture in which data is cached at the worker, in an embodiment, this may enable scalability of apparatus 100 and/or computing device.

Still referring to FIG. 1, processor 108 may be designed and/or configured to perform any method, method step, or sequence of method steps in any embodiment described in this disclosure, in any order and with any degree of repetition. For instance, processor 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in one embodiment, apparatus 100 includes at least an interface 152 configured to facilitate telecommunication for a participant 140. As used in this disclosure, an "interface", is a software and/or hardware device configured to facilitate a telecommunication between one or more participants and one or more interlocutors. Interface 152 may include a graphical user interface, command line interface (CLI), menu-driven user interface, touch user interface, voice user interface (VUI), form-based user interface, natural language user interface, and the like. For example, interface 152 may provide an interconnection between one or more participants and a communication device, such as a computer screen, a television, radio, speaker, a projector and the like; in some cases, a display may comprise an audio-visual display and thereby may additionally include at least an audio transducer (e.g., speakers). Exemplary non-limiting displays include liquid crystal displays, cathode ray tube displays, light emitting diode displays, organic light emitting diode displays, quantum dot displays, micro-electromechanical system (MEMS) projector, virtual reality headset, head mounted display, and the like. In some embodiments, interface 152 may communicate content to one or more participants remotely. As described in this disclosure, "content" is any media (e.g., visual and/or audio) which contains information intended to be communicated to an audience. Exemplary content includes course a document, slide show, spreadsheet, diagram, video, audio, images, interactive media, a question, text, and the like. "Telecommunication," as used in this disclosure, is the exchange of information over significant distances by electronic means which may include all types of voice, data, and/or video transmission such as teleconference (e.g., Zoom, Team, and the like) using a wide range of information-transmitting technologies and communications infrastructures, such as wire phones, mobile devices, microwave communications, fiber optics, satellites, radio and television broadcasting, internet, and telegraphs. In addition, as disclosed herein, a "participant" is an individual who is actively involved in the telecommunication. For instance, participant 140 may be a person who is attending a teleconference via Zoom, Team, or the like. A "question," as used in this disclosure, is an interrogative expression used to evaluate the trustworthiness of participant 140 and/or test veracity. For example, a question may be, as non-limiting examples, a verbal, written, typed, interrogative expression. Questions may be related to content presented to participant 140 through interface 152. For example, a picture of a flowerpot may be communicated to participant 140 through interface 152 along with a question asking participant 140 whether he or she recognizes the flowerpot in the image. In some embodiments, questions may be related to one another may be communicated to participant 140 without the aid of content. For example, "what is your name," "what is your address," "were you at this address on the night of September $4^{th}$," and the like. In some additional embodiments, apparatus 100 may be used with a live instructor (i.e., teacher, professor, trainer, supervisor, and the like), for example taking place of interface 152 or being presented by way of interface 152. In some cases, questions may be used for professional training, scholastic education, military training, physical training, satisfying one's curiosity, sport's training, self-help, therapy, meditation, mindfulness training, and the like. In some additional embodiments, questions may include material interacted with by a subject, for example in service of a job or task. As an example, questions may include security camera footage and a subject viewing the questions may include security personnel. In another non-limiting embodiment, questions may be delivered substantially with or without a display. For example, questions may be delivered through audio or through a live scene (e.g., live presenter).

Still referring to FIG. 1, in some embodiments, computing device 104 may additionally be configured to control at least a display parameter for interface 152. As used in this disclosure, a "display parameter" is a controllable characteristic of a display. Exemplary non-limiting display parameters may include visual parameters, audio parameters, and/or content parameters. As used in this disclosure, "audio parameters" is a controllable sound characteristic. Exemplary non-limiting audio parameters may include audio volume, audio mixer settings (e.g., treble, mid, bass, etc.), audio balance settings (e.g., left, right, etc.), audio fade settings (e.g., front, back, etc.), audio content settings (e.g., white noise, pink noise, etc.), and the like. In some cases, an audio parameter may include at least a change to audio content. For example, in some cases content may be augmented with audio intended to have an effect on a state of participant 140; for instance, a precipitous and loud sound may be inserted in order to increase alertness of participant 140. In some cases, display parameter may include a speed of presentation of content and questions. For example, speed of presentation may be varied continuously and/or discretely from 0.5× to 3.0× speed of presentation.

Continuing to refer to FIG. 1, apparatus 100 includes a plurality of sensors 116 configured to detect a plurality of signals from the participant. As used in this disclosure, a "sensor" is any electronic device configured to detect and/or transmit signals 120, which may include biological and/or physical signals of participant 140 and any surrounding elements associated with participant 140. For instance, the plurality of sensors 116 may include sensors configured to detect biofeedback signals, visible and auditory feedback signals from participant 140 such as a NIR spectroscopy sensor (NIRS), an exhalation sensor, an inhalation sensor, a cutaneous sensor, a speech sensor, an eye movement sensor, and the like. A "biofeedback signal," as disclosed herein, is biological parameter that is indicative of a response. As non-limiting examples, biological parameters may include circulatory, respiratory, cutaneous, and the like. A "visible feedback signal," as used in this disclosure, is visual movements that is indicative of a response. As non-limiting examples, visual movements may include eye movement, blinks, facial expressions, body movements, and the like. An "auditory feedback signal," as used in this disclosure, is sound captured that is indicative of a response. In a non-limiting example, sound may include participant's voice, speech, pitch, breathing, background noise, interlocutor's voice, and the like. A "surrounding element," as used in this disclosure, is any external and/or peripheral conditions and/or elements related to participant 140. For instance, in a non-limiting example, a surrounding element may include biometrics and/or response signals from the participant's interlocutor 148. In another non-limiting example, a surrounding element may include the geographic location of participant 140 and/or weather conditions at the geographic location. As used in this disclosure, a "signal" is a representation of at least an element of data. A signal may include an analog signal, a digital signal, an electrical signal, an optical signal, and the like. In some cases, a signal may be represented according to one or more protocols, for example without limitation universal asynchronous receiver-transmitter (UART), serial communication protocols, parallel communication protocols, and/or Ethernet protocols. In some embodiments, signals 120 may be correlated to the trustworthiness of participant 140. In some embodiments, the NIRS, the exhalation sensor, the inhalation sensor, and the cutaneous sensor may be consistent with any NIRS, exhalation sensor, inhalations sensor, and cutaneous sensor disclosed in U.S. patent application Ser. No. 17/959,593, filed on Oct. 4, 2022, entitled "APPARATUS AND METHODS FOR DETERMINING HUMAN PERFORMANCE," the entirety of which is incorporated herein by reference.

Still referring to FIG. 1, a "NIR spectroscopy sensor," as used in this disclosure, is an optical sensor capable of detecting light emitted, reflected, or passing through human tissue. More specifically, a NIRS, as used herein, is a sensor that detects signals in the near-infrared electromagnetic spectrum region, having wavelengths between 780 nanometers and 2,500 nanometers. An "exhalation sensor," as used in this disclosure, is any device configured to detect the amount and/or pattern of an exhalation of breath. The exhalation sensor, in one embodiment, and without limitation, may be configured to recognize such a pattern and identify the pattern as indicative of a current exhalation of participant 140. An "inhalation sensor," as used in this disclosure, is any device configured to detect the amount and/or pattern of an inhalation of breath. The inhalation sensor, in one embodiment, and without limitation, may be configured to recognize such a pattern and identify the pattern as indicative of a current inhalation of participant 140. A "cutaneous sensor," as disclosed herein, is any device configured to detect any biofeedback signals relating to or affecting the skin of participant 140. In one embodiment, and without limitation, the cutaneous sensor may be a skin temperature sensor and/or skin galvanic sensor which may be configured to detect skin temperature and/or blood circulation. In some embodiments, and without limitation, the biometrics of interlocutor 148 of participant 140 may be detected using any of the sensors described in this disclosure in order to monitor the trustworthiness of participant 140 as described further below. In a non-limiting example, the biometrics of interlocutor 148 may include circulatory, respiratory, cutaneous parameters, and the like.

Continuing to refer to FIG. 1, a "speech sensor," is any device that is configured or adapted to detect a speech parameter. A "speech parameter" is an element of information associated with speech. An exemplary non-limiting speech parameter is a representation of at least a portion of audible speech, for instance a digital representation of audible speech. In some cases, a speech parameter may be transmitted or represented by a speech signal. A speech signal may include any signal described in this disclosure. As used in this disclosure, a "speech parameter" may include any observable parameter associated with speech, including without limitation audible response and/or acoustic response. Speech response may include pressure changes, for instance audible pressure changes as detectable by a microphone. In some cases, speech parameter may not be directly related to speech, and may include response related to breathing. For example, breathing sounds may be detected by the speech sensor and used as speech parameter. In some embodiments, the speech sensor may include a bone conductance transducer. In some cases, bone conductance transducer may be configured to detect at least a speech parameter as a function of at least a speech parameter. In some cases, apparatus 100 may utilize speech parameters of a participant's interlocutor 148 instead of the participant's speech parameters to monitor the trustworthiness of the participant as described further below. For instance, in some cases, the participant may be in audible communication with the interlocutor 148, through communication microphones. These communication signals may be used by apparatus 100 as speech parameters. In one embodiment, processor 108 is configured to determine a speech pattern as a function of the speech parameters. As used in this disclosure, a "speech pattern" is a representation of a speech-related behavioral parameter. In some cases, a speech pattern may be derived or otherwise determined from the speech parameter. Exemplary speech patterns include timber, pitch, and cadence of speech. In some cases, speech pattern may be unrelated to content of an actor's speech. Instead, in some cases, speech pattern may be related to changes audible characteristics of actor's speech. In some cases, speech pattern may be derived through analysis of speech parameters, for instance audio analysis described above. Speech pattern may include one or more prosodic variables. As used in this disclosure, "prosodic variables" are variables that relate to spoken syllables or larger speech units. In some cases, speech pattern may include audible variables, for instance pitch, change in pitch, length of units of speech such as syllables, volume, loudness, relative volume of a unit speech, timbre, quality of sound, and the like. In some cases, speech pattern may include acoustic terms. Acoustic terms may include without limitation fundamental frequency, duration, intensity, sound pressure, spectral characteristics, and the like. Speech pattern may include speech tempo. As used in this disclosure, "speech tempo" is a measure of a number of speech units within a certain amount of time. Speech tempo may vary within speech of one person, for instance according to context and emotional factors. Speech tempo may have units of syllables per second.

Still referring to FIG. 1, an "eye movement sensor," as used in this disclosure, is any device configured to detect and/or track eye movements and/or blinks. For instance, in one embodiment, and without limitation, the eye movement sensor is an electromyography (EMG) sensor configured to detect electrical activity of extraocular muscles as described further below. In one embodiment, the eye movement sensor may be configured to detect an eye pattern based on eye movements and/or blinks. As used in this disclosure, an "eye pattern" is a representation of an eye-related behavioral parameter. For instance, an eye pattern may be derived or otherwise determined using the EMG sensor based on eye movements. Eye movements may be divided into fixations and saccades. Fixations may occur when eye gaze pauses in a certain position. Saccades may occur when eye gaze moves to another position. A resulting series of fixations and saccades may be called a scan path. Smooth pursuit describes a scan path of an eye following a moving object. Fixational eye movements include micro saccades: small, involuntary saccades that occur during attempted fixation. Most information from an eye is made available to a viewer during a fixation or smooth pursuit, but not during a saccade. Scan paths may be useful for analyzing cognitive intent, interest, and salience. Other biological factors may affect the scan path as well. In some cases, eye parameter may include blink rate. As used in this disclosure, is any time related variable associated with movement of an eyelid. Exemplary, blink rates include number of blinks over a certain time, average frequency of blinks, amount of time per blink, delay time between stimulation and a blink, and the like. In some embodiments, eye movements of interlocutor 148 of participant 140 may be detected using the eye movement sensor in order to monitor the trustworthiness of participant 140 as described further belowq.

Continuing to refer to FIG. 1, in some embodiments, sensors 116 may include a body movement sensor. A "body movement sensor," as used in this disclosure, is any device configured to detect and/or track a participant's posture, position, body movements, and the like. For instance, in an unlimiting exemplary embodiment, a machine vision camera may be deployed to detect the participant's body movements and the like. Alternatively or additionally, in some cases, range-imaging or 3D camera may be used for this purpose. An exemplary range-imaging camera that may be included as an at least a senser is Intel® RealSense™ D430 Module, from Intel® of Mountainview, California, U.S.A. D430 Module comprises active infrared (IR) illumination and a stereoscopic camera, having global shutters and frame rate of up to 90 fps. D430 Module provide a field of view (FOV) of 85.2° (horizontal) by 58° (vertical) and an image resolution of 0×720. Range-sensing camera may be operated independently by dedicated hardware, or, in some cases, range-sensing camera may be operated by a computing device. In some cases, range-sensing camera may include software and firmware resources (for execution on hardware, such as without limitation dedicated hardware or a computing device). D430 Module may be operating using software resources including Intel® RealSense™ SDK 2.0, which include opensource cross platform libraries. In one embodiment, the body movement sensor is configured to detect and/or track participant's interlocutor's posture, position, body movements and the like in order to monitor the participant's trustworthiness as described further below.

Still referring to FIG. 1, in some embodiments, sensors 116 may perform one or more processing steps on signals 120. For instance, in a non-limiting example, sensors 116 may analyze, modify, and/or synthesize signals 120 to improve the signal, for instance by improving transmission, storage efficiency, and/or signal to noise ratio. Exemplary methods of signal processing may include analog, continuous time, discrete time, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits: sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point, floating-point, real-valued, and/or complex-valued multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal. In some cases, signals 120 may be correlated to certain levels of participant trustworthiness. In some cases, participant trustworthiness may be quantitatively represented by way of a real-time metric 132 such as a confidence metric. As used in this disclosure, a "confidence metric" is a real-time probability measurement of a participant's trustworthiness. In a non-limiting example, the confidence metric of the participant's trustworthiness may include honest, dishonest, and the like. In one embodiment, real-time metric 132 may be generated using fuzzy sets as described further below.

Still referring to FIG. 1, processor 108 is configured to receive a plurality of signals 120 from sensors 116. As used in this disclosure, "receive" means to accept, collect, or otherwise gather input from a user and/or device. In some embodiments, signals 120 may be in various format such as, without limitation, image, video, audio, biometrics, txt file, JSON file, word document, pdf file, excel sheet, and the like thereof. In other cases, signals 120 may be present in any data structure described in this disclosure.

Continuing to refer to FIG. 1, in some embodiments, signals 120 may be present as a vector. As used in this disclosure, a "vector" is a data structure that represents one or more quantitative values and/or measures of signals 120. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes.

With continued reference to FIG. 1, in some embodiments, signals 120 may be present as a dictionary. As used in this disclosure, a "dictionary" is a data structure containing an unordered set of key value pairs. In this disclosure, a "key value pair" is a data representation of a data element such as, without limitation, biofeedback signals, visible and auditory feedback signals of participant 140. For instance, in a non-limiting exemplary embodiment, signals 120 may include circulatory feedback, respiratory feedback, skin temperature feedback, eye movement feedback, body movement feedback, voice feedback, and the like associated with participant 140 and/or the interlocutor 148 of participant 140. In some cases, dictionary may be an associative memory, or associative arrays, or the like thereof. In a non-limiting example, dictionary may be a hash table. In an embodiment, kay value pair may include a unique key, wherein the unique kay may associate with one or more values. In another embodiment, key value pair may include a value, wherein the value may associate with a single key. In some cases, each key value pair of set of key value pairs in dictionary may be separated by a separator, wherein the separator is an element for separating two key value pairs. In a non-limiting example, separator may be a comma in between each key value pairs of plurality of key value pairs within dictionary. In another non-limiting example, a dictionary may be expressed as "{first key value pair, second key value pair}," wherein the first key value pair and the second key value pair may be separate by a comma separator, and wherein both first key value pair and second key value pair may be expressed as "first/second key: first/second value." In a further non-limiting example, signals 120 may be present as a dictionary: "{1: A, 2: B, 3: C}," wherein A may be a first user related data correspond to a first data object, B may be a second user related data correspond to a second data object, and C may be a third user related data correspond to a third data object. Signals 120 may include any kind of information related to participant 140 and/or the interlocutor 148 of participant 140 such as, without limitation, information associated with biofeedback, visible feedback, auditory feedback, and the like thereof. Additionally, or alternatively, dictionary may include a term index, wherein the term index is a data structure to facilitate fast lookup of signals 120 (i.e., index). In some cases, without limitation, term index may use a zero-based indexing, wherein the zero-based indexing may configure dictionary to start with index 0. In some cases, without limitation, term index may use a one-based indexing, wherein the one-based indexing may configure dictionary to start with index 1. In other cases, without limitation, term index may use a n-based indexing, wherein the n-based indexing may configure dictionary to start with any index from 0 to n. Further, term index may be determined/calculated using one or more hash algorithms. Hash algorithms may be any hash algorithm described above in this disclosure.

With continued reference to FIG. 1, in other embodiments, signals 120 may be present as any other data structure such as, without limitation, tuple, single dimension array, multi-dimension array, list, linked list, queue, set, stack, dequeue, stream, map, graph, tree, and the like thereof. In some embodiments, signals 120 may be present as a combination of more than one above data structures. In a non-limiting example, signals 120 may be a dictionary of lists. As will be appreciated by persons having ordinary skill in the art, after having read the entirety of this disclosure, the foregoing list is provided by way of example and other data structures can be added as an extension or improvements of apparatus 100 disclosed herein. In some embodiments, without limitation, signals 120 may be an immutable data collection, wherein the immutable data collection is a data collection that cannot be changed, modified, and/or updated once the data collection is received. In other embodiments, without limitation, signals 120 may be a mutable data collection, wherein the mutable data collection is a data collection that can be changed, modified, and/or updated once the data collection is received.

Still referring to FIG. 1, processor 108 is configured to generate a participant trustworthiness classifier 124 as a function of a participant trustworthiness machine-learning algorithm; train the participant trustworthiness classifier 124 using at least a training sample 128, wherein the at least a training sample 128 correlates the plurality of signals 120 to responses of known trustworthiness; and generate a participant trustworthiness 136 as a function of the participant trustworthiness classifier 124. A "classifier," as used in this disclosure is a machine-learning model, such as a mathematical model, neural net, or program generated by a machine learning algorithm known as "classification algorithm," as described in further detail below, that parses inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A "participant trustworthiness classifier," as used in this disclosure, is a classifier that takes the plurality of signals 120 detected by sensors 116 from participant 140 as input to output a real-time metric 132 correlated to participant trustworthiness 136 in telecommunications such as, without limitation, a teleconference. In some embodiment, a teleconference may be a Zoom meeting, a Team meeting, or the like. In a non-limiting example, the plurality of signals 120 may include biofeedback signals, visible feedback signals, auditory feedback signals, and the like. Participant trustworthiness classifier 124 may include any machine-learning model and/or classifier described in this disclosure. A "machine-learning model," as used in this disclosure, involves a process that automatedly uses training samples to generate an algorithm and/or model performed by processor 108 to produce outputs given data provided as inputs, for instance and without limitation as described in further detail below. This is in contrast to a non-machine learning software program where the commands to be executed are determined in advance by a user and written in a programming language. A "training sample," as disclosed herein, is data including correlations and/or examples usable by a machine learning algorithm to generate machine-learning models and/or to be operated on by a lazy learning algorithm as described below. As used in this disclosure, a "participant trustworthiness machine-learning algorithm" is a machine-learning algorithm that is used to generate participant trustworthiness classifier 124. The participant trustworthiness machine-learning algorithm may include any machine-learning algorithm and/or process described in this disclosure.

Still referring to FIG. 1, training sample 128 may be obtained by processor 108 in any manner and/or form as described anywhere in this disclosure, including and without limitation retrieving from a data store 144 such as, and without limitation, a database. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Continuing to refer to FIG. 1, in one embodiment, participant trustworthiness classifier 124 may be trained by training sample 128 which may include biofeedback signals collected by at least a NIRS, an exhalation sensor, an inhalation sensor, cutaneous sensor, and the like from participant 140. The biofeedback signals may be correlated to feedback, response, and/or answers of known trustworthiness. In an exemplary embodiment, participant 140 may be asked questions with known answers. Biometrics of participant 140 may be recorded as feedback, response, and/or answers of labeled and known answers to train participant trustworthiness classifier 124. For instance, and without limitation, participant 140 may be asked to provide his full name truthfully and then untruthfully. Biofeedback signals, such as heart rate, blood pressure, inhalation and exhalation patterns, skin temperature, skin dryness, and the like may be recorded for training purposes. In some embodiments, prior information based on studies and/or research regarding biofeedback signals based on common features when a participant answers a question truthfully or untruthfully may be collected as training sample 128.

Still referring to FIG. 1, in one embodiment, participant trustworthiness classifier 124 may be trained by training sample 128 which may include biofeedback signals collected from interlocutor 148 of participant 140 such that the interlocutor's own biofeedback signals may help to train the classifier. The biofeedback signals of the interlocutor may be correlated to his reaction in response to participant's 140 feedback, response, and/or answers of known trustworthiness. For instance, the interlocutor 148 may be told participant's 140 name prior to participant 140 answering the question of what his full name is. In some embodiments, interlocutor 148's own biofeedback signals in response to participant 140 may help train the classifier. As a non-limiting example, certain biofeedback signals may indicate that interlocutor 148 believes that participant is lying. For example, this may include elevated heat rate, narrowed eyes, among others. For instance, biometrics of the interlocutor's biofeedback signals, such as heart rate, blood pressure, inhalation and exhalation patterns, skin temperature, skin dryness, and the like may be recorded and correlated to answers of known trustworthiness. In some embodiments, the biofeedback signals of more than one interlocutor 148 may be recorded.

Still referring to FIG. 1, in one embodiment, participant trustworthiness classifier 124 may be trained by training sample 128 which may include what can be seen and heard during a teleconference. In some embodiments, what can be seen may include visible feedback signals and what can be heard may include auditory feedback signals. In one embodiment, training sample 128 may include a speech and/or speech pattern of participant 140 and/or the interlocutor 148 detected by a speech sensor, posture, position, body movement, and the like of participant 140 and/or the interlocutor 148 detected by a body movement sensor, and eye movement and/or blink detected by an eye movement sensor. The visible and auditory feedback signals may be correlated to feedback, response, and/or answers of known trustworthiness. In one embodiment, visible and auditory feedback signals of participant 140 and/or the interlocutor 148 may be recorded as feedback, response, and/or answers of labeled and known answers to train participant trustworthiness classifier 124. For instance, and without limitation, participant 140 may be again asked to provide his full name truthfully and then untruthfully. Visible feedback signals, such as blinks rates over a certain period of time, delay time between stimulation and a blink, fixational eye movement, eye shut, movements of body parts such as head, shoulder, arms, upper body, legs, fingers, hands, and the like may be recorded to correlate visible feedback signals to truthful response and/or untruthful response. In some embodiments, visible feedback signals as described above may be recorded for the interlocutor 148. Auditory feedback signals, such as change in pitch, length of units of speech, volume, prominence, quality of sound, and the like may be recorded to correlate auditory feedback signals to truthful response and/or untruthful response. In some embodiments, prior information based on studies and/or research regarding visible and auditory signals based on common features when a participant answers a question truthfully or untruthfully may be collected as training sample 128.

Still referring to FIG. 1, in one embodiment, processor 108 may be configured to determine at least an eye pattern using one or more machine learning processes. For example, in some cases, processor 108 may receive an eye pattern training data. As used in this disclosure, an "eye pattern training data" is a training set that correlates eye parameters to eye patterns. In some cases, eye pattern training data may be compiled from historic information, for instance by participant 140. In some cases, eye pattern training data may be compiled by an unsupervised machine learning process. Eye pattern training data may use eye parameters correlated to eye patterns for participant 140. Historic information may include information from eye-related study. Processor 108 may input eye pattern training data into an eye pattern machine learning algorithm. As used in this disclosure, an "eye pattern machine learning algorithm" is any machine learning algorithm that is configured to train an eye pattern machine learning model using eye pattern training data. Processor 108 may train an eye pattern machine learning model, as a function of eye pattern machine learning algorithm. As used in this disclosure, "eye pattern machine learning model" is a machine learning model that is configured to take as input at least an eye parameter and output at least a correlated eye pattern. Processor 108 may determine at least an eye pattern as a function of eye pattern machine learning model and at least an eye parameter.

Still referring to FIG. 1, in some embodiments, processor 108 may be configured to determine a speech pattern by using one or more machine learning processes. For example, in some cases, processor 108 may receive a speech pattern training data. As used in this disclosure, a "speech pattern training data" is a training set that correlates speech parameters to speech patterns. In some cases, speech pattern training data may be compiled from historic information, for instance by participant 140. In some cases, speech pattern training data may be compiled by an unsupervised machine learning process. Speech pattern training data may use speech parameters correlated to speech patterns for participant 140. Historic information may include information from speech-related study. In some cases, historical information may include information captured from use of apparatus 100. Processor 108 may input speech pattern training data into a speech pattern machine learning algorithm. As used in this disclosure, a "speech pattern machine learning algorithm" is any machine learning algorithm that is configured to train a speech pattern machine learning model using speech pattern training data. Processor 108 may train a speech pattern machine learning model, as a function of speech pattern machine learning algorithm. As used in this disclosure, "speech pattern machine learning model" is a machine learning model that is configured to take as input at least a speech parameter and output at least a correlated speech pattern. Processor 108 may determine at least a speech pattern as a function of speech pattern machine learning model and at least a speech parameter. Processor 108 may determine an eye pattern and speech using one or more machine learning processes as described in in U.S. Nonprovisional patent application. Ser. No. 17/731,4935, entitled "SYSTEMS AND METHODS FOR DETERMINING ACTOR STATUS ACCORDING TO BEHAVIORAL PHENOMENA," the entirety of which is incorporated herein by reference.

Continuing to refer to FIG. 1, in some embodiments, participant trustworthiness classifier 124 may be trained in accordance with responses to questions with known correct/incorrect answers provided by participant 140. In one embodiment, participant 140 may be required to provide a list of responses to questions with known correct and/or incorrect answers. Any biofeedback, visible, and/or auditory feedback signals may be collected as training sample 128 which correlate the signals to known trustworthiness. Once participant trustworthiness classifier is trained, visible and/or auditory feedback signals captured during a teleconference would be sufficient and no biofeedback signals would be required to generate participant trustworthiness 136 as a function of participant trustworthiness classifier 124.

Still referring to FIG. 1, processor 108 may be additionally configured to generate a confidence metric associated with determining participant trustworthiness 136. As used in this disclosure, a "confidence metric" is a quantified score that is associated with a process, for example a fit or probability of a classification. Confidence metric may be generated and/or output from any machine-learning process as described in this disclosure. In one embodiment, the confidence metric may be displayed with participant trustworthiness 136 to interlocutor 148 and/or third-party observers of the teleconference in real time and/or after the conclusion of the teleconference. In one embodiment, confidence metric may be generated using fuzzy sets as described further below. In some embodiments, processor 108 may determine the trustworthiness of a participant using one or more machine learning processes as described in U.S. patent application Ser. No. 18/072,397, entitled "APPARATUSES AND METHODS FOR INDIVIDUALIZED POLYGRAPH TESTING," the entirety of which is incorporated herein by reference.

Figure 2:
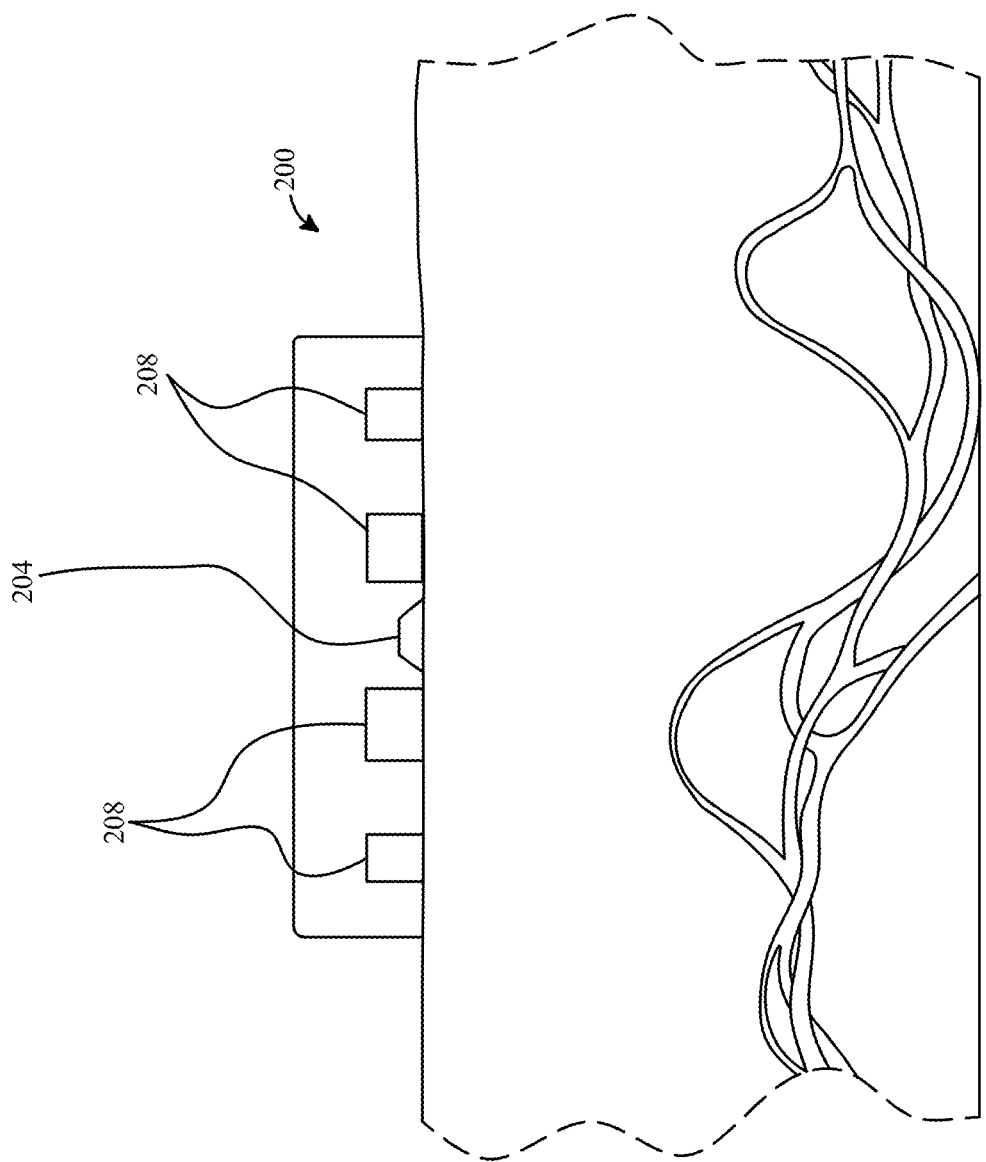
FIG. 2 is a schematic diagram illustrating an exemplary embodiment of a near-infrared spectroscopy sensor.

Referring now to FIG. 2, FIG. 2 illustrates an exemplary embodiment of a NIRS 200 against an exterior body surface, which may include skin. NIRS 200 may include a light source 204, which may include one or more light-emitting diodes (LEDs) or similar element. Light source 204 may, as a non-limiting example, convert electric energy into near-infrared electromagnetic signals. Light source 204 may include one or more lasers. NIRS 200 may include one or more detectors 208 configured to detect light in the near-infrared spectrum. Although the wavelengths described herein are infrared and near-infrared, light source 204 may alternatively or additionally emit light in one or more other wavelengths, including without limitation blue, green, ultraviolet, or other light, which may be used to sense additional physiological parameters. In an embodiment, light source may include one or more multi-wavelength light emitters, such as one or more multi-wavelength LEDs, permitting detection of blood-gas toxicology. Additional gases or other blood parameters so detected may include, without limitation $CO_2$ saturation levels, state of hemoglobin as opposed to blood oxygen saturation generally. One or more detectors 208 may include, without limitation, charge-coupled devices (CCDs) biased for photon detection, indium gallium arsenide (InGaAs) photodetectors, lead sulfide (PbS) photodetectors, or the like. NIRS 200 may further include one or more intermediary optical elements (not shown), which may include dispersive elements such as prisms or diffraction gratings, or the like. In an embodiment, NIRS 200 may be used to detect one or more circulatory parameters. A "circulatory parameter," also referred to as a blood parameter, as used in this disclosure, is a parameter describing the state of blood vessels. For example, arteries, veins, or capillaries, any datum describing the rate, volume, pressure, pulse rate, or other state of flow of blood or other fluid through such blood vessels, chemical state of such blood or other fluid, or any other parameter relative to health or current physiological state of a participant as it pertains to the cardiovascular system. As a non-limiting example, at least a circulatory parameter may include a blood oxygenation level of user's blood. At least a circulatory parameter may include a pulse rate a "pulse rate," as sued in this disclosure, is the rate at which a person's heart beats. At least a circulatory parameter may include a blood pressure level. A "blood pressure level," as used in this disclosure, is the measurement of the force of circulating blood on the walls of the arteries. At least a circulatory parameter may include heart rate variability and rhythm. "Heart rate variability," as used in this disclosure, is a measure of the variation in time between each heartbeat. "Heart rate rhythm," as used in this disclosure, is the time pattern in which a heart beats. At least a circulatory parameter may include a plethysmograph describing the blood-flow of a participant; in an embodiment, plethysmograph may describe a reflectance of red or near-infrared light from blood. One circulatory parameter may be used to determine, detect, or generate another circulatory parameter; for instance, a plethysmograph may be used to determine pulse oxygen level (for instance by detecting plethysmograph amplitude), pulse rate (for instance by detecting plethysmograph frequency), heart rate variability and rhythm (for instance by tracking pulse rate and other factors over time), and blood pressure, among other things. Further disclosure related to NIRS 200 may be found in U.S. patent application Ser. No. 16/859,483, filed on Apr. 27, 2020, entitled "HUMAN PERFORMANCE OXYGEN SENSOR," the entirety of which is incorporated herein by reference.

Figure 3:
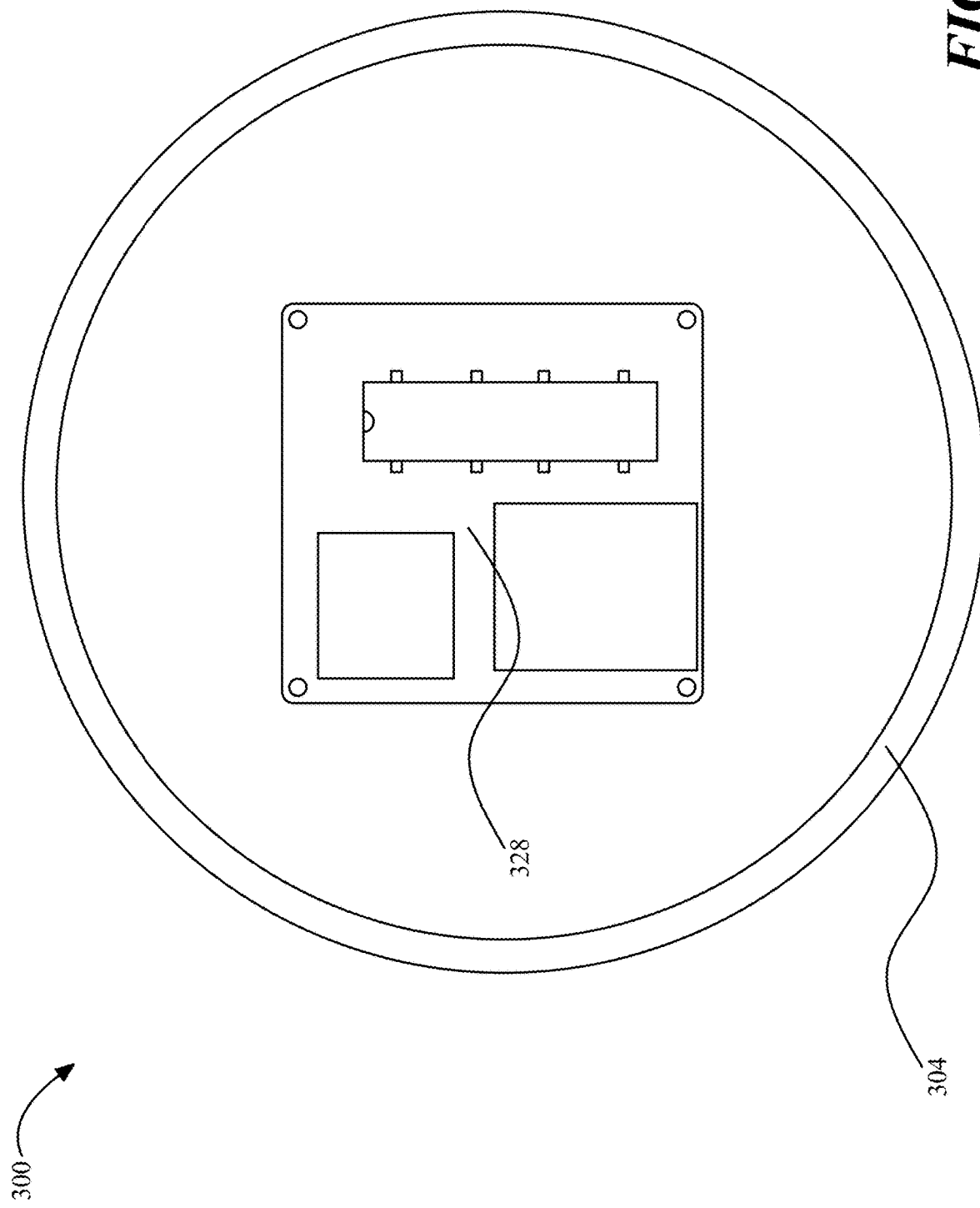
FIG. 3 is a schematic diagram illustrating an exemplary embodiment of a combined exhaled air and environmental gas sensor.

Referring now to FIG. 3, FIG. 3 illustrates an exemplary embodiment of combined exhaled air and environmental gas sensor apparatus 300 for mobile respiratory equipment is illustrated. Apparatus 300 includes a housing 304, within which one or more electronic components are positioned. One or more electric components include sensors 116. Sensors 116 may include an exhaled air and environmental gas sensor. Housing 304 may be constructed of any suitable material or combination of materials, including without limitation metal, metal such as aluminum, titanium, steel, or the like, plant materials including bamboo and/or wood, polymer materials such as polycarbonate, polymethyl methacrylate, acrylonitrile butadiene styrene (ABS), or the like, synthetic fibers such as carbon fiber, silicon carbide fiber, metallic fiber, or the like, composite materials such as fiberglass, laminated fiberglass, plywood, or the like, or any combination of the above. Housing 304 may be manufactured in any suitable process including molding such as injection molding, additive manufacturing such as "three-dimensional printing" and/or stereolithography, subtractive processes such as machining, and/or any other process or combination of processes. Housing 304 may include a sensor-bearing surface on or to which one or more electrical components including sensor 116 may be attached. A sensor-bearing surface may be positioned opposite a port aperture as described in further detail below.

Figure 4B:
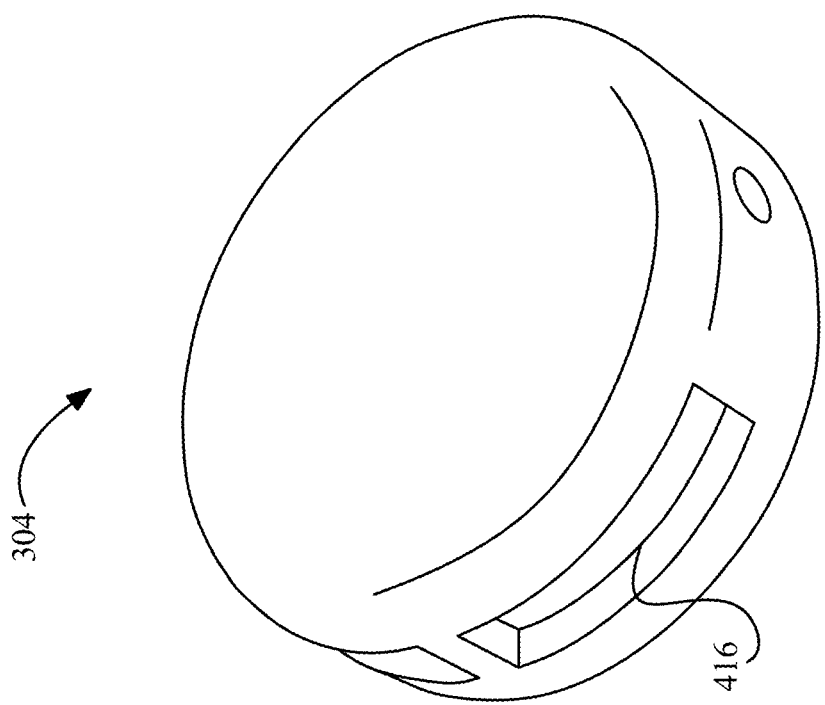
FIG. 4B is a schematic diagram illustrating an exemplary embodiment of a housing of the combined exhaled air and environment gas sensor.
Figure 4A:
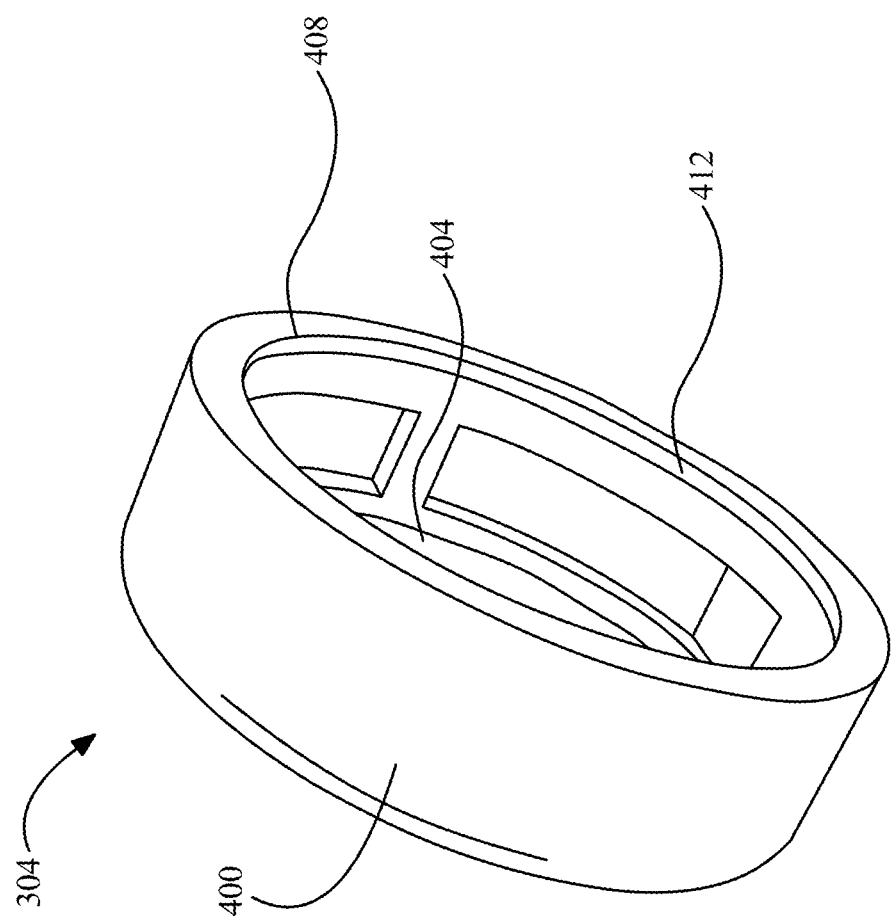
FIG. 4A is a schematic diagram illustrating an exemplary embodiment of a housing of the combined exhaled air and environment gas sensor.

Referring now to FIG. 4A, a perspective view of an exemplary embodiment of a housing 304 is illustrated. Housing 304 may include an exterior surface 400, an interior surface 404, an interior space surrounded by interior surface 404, and one or more apertures. Housing 304 may have any suitable shape, including a shape of a cap to be placed over a respiratory exhaust port as described in further detail below. Housing 304 may be substantially cylindrical and may have one or more rounded edges. Housing 404 includes a port aperture 408. Port aperture 408 is an aperture that receives exhaled breath from a respiratory exhaust port as described in further detail below, admitting the exhaled breath into interior space of housing 304. Housing 304 further includes a connector 412, which may be located at port aperture 408. A "connector," as used in this disclosure, is a structural feature and/or component that affixes one aperture, opening, port, or the like to another in a way that permits flow of fluids such as liquid and/or gases to flow from one aperture, opening, port, or the like to another. Connector 412 is configured to attach port aperture 408 to exhaust port. Connector 412 may include, without limitation, a rim that fits and/or snaps over a feature of exhaust port to affix port aperture 408 thereto; connector 412 may alternatively or additionally include fastener, such as a bold or screw that inserts through a hole in housing 304 and screws into a reciprocally threaded hole in exhaust port. Connector 412 may include threading around port aperture 408 that engages reciprocal threading at exhaust port. Connector 412 may include and/or be combined with adhesives, sealants, or the like. Connector 412 may permit repeated detachment and reattachment or may affect a permanent connection between port aperture 408 and exhaust port. Persons skilled in the art, upon reviewing the entirety of this disclosure, will be aware of various alternative or additional structures and/or components that may be used for connector 412. Port aperture 408 may be located opposite a sensor-bearing surface; for instance, the sensor-bearing surface may be located on interior surface 404 at a distal end of housing 304, while port aperture 408 may be located at a proximal end of housing 304.

Referring now to FIG. 4B, housing 304 includes at least an ambient aperture 416 connecting to an exterior environment. An "exterior environment," as used in this disclosure, means air that is exterior to an element of mobile respiratory equipment as described below; for instance, where mobile respiratory equipment is a respirator mask, exterior environment may include air outside of the mask and around a person wearing the mask, as opposed to air or gas between the mask and mouth or nose of the person. At least an ambient aperture 416 includes an opening connecting interior space to exterior environment. At least an ambient aperture 416 may permit air to travel freely between interior space and exterior environment. Further disclosure related to the combined exhaled air and environmental gas sensor 400 may be found in U.S. patent application Ser. No. 17/536,867, filed on Nov. 29, 2021, entitled "RESPIRATION SYSTEM AND METHOD OF USE," which is a continuation-in-part of Non-Provisional application Ser. No. 17/333,169 filed on May 28, 2021 entitled "SYSTEMS AND METHODS FOR INSPIRATE SENSING TO DETERMINE A PROBABILITY OF AN EMERGENT PHYSIOLOGICAL STATE" and is a continuation-in-part of Non-provisional application Ser. No. 17/501,653 filed on Oct. 14, 2021 entitled "COMBINED EXHALED AIR AND ENVIRONMENTAL GAS SENSOR APPARATUS," which is a continuation-in-part of Non-provisional application Ser. No. 16/933,680 filed on Jul. 20, 2020 of the same title; the entirety of each application is incorporated herein by reference.

Figure 5:
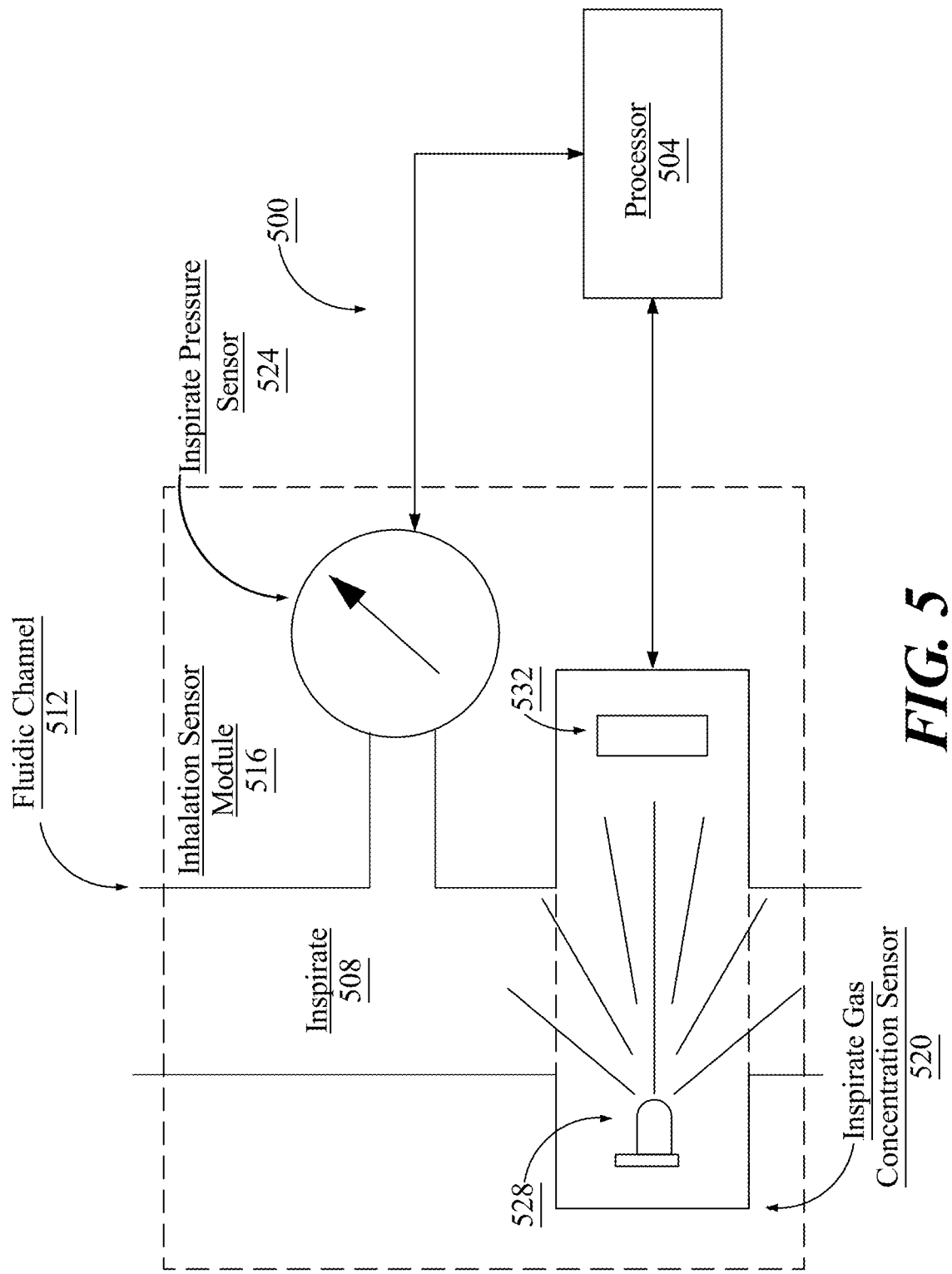
FIG. 5 is a block diagram illustrating an exemplary embodiment of an inhalation sensor.

Referring now to FIG. 5, an exemplary inspirate sensor 500 is illustrated. Sensor 116 may include inspiration sensor 500. In some embodiments, inspirate sensor 500 may include a processor 504 for making determinations as a function of sensed parameters associated with at least an inspirate 508. In some cases, at least a portion of an at least an inspirate 508 is contained within a fluidic channel 512. An exemplary inhalation sensor module 516 is shown in fluid communication with fluidic channel 512. In some cases, inhalation sensor module may include at least a gas concentration sensor 520. In some cases, inhalation sensor module 516 may include at least an inspirate pressure sensor 524. Inspirate gas concentration sensor 520 may include any gas concentration sensor, for instance those described in this application. In some cases, inspirate gas concentration sensor 520 may include an optical gas concentration sensor. Non-limiting optical gas concentration sensors include infrared transmission and/or absorbance spectroscopy type sensors and fluorescence excitation type sensors. Commonly, an optical gas concentration sensor may include a radiation source 528 and a radiation detector 532. In some versions, radiation source 528 may include a light source 528 that may generate a light and illuminate at least a portion of at least an inspirate 508. Radiation source 528 may generate any of a non-limiting list of lights, including coherent light, non-coherent light, narrowband light, broadband light, pulsed light, continuous wave light, pseudo continuous wave light, ultraviolet light, visible light, and infrared light. In some cases, radiation source 528 may include an electromagnetic radiation source that may generate an electromagnetic radiation and irradiate at least a portion of at least an inspirate 508. Radiation source 528 may generate any of a non-limiting list of radiations including radio waves, microwaves, infrared radiation, optical radiation, ultraviolet radiation, X-rays, gamma-rays, and light. Non-limiting examples of radiation sources 528 include lasers, light emitting diodes (LEDs), light emitting capacitors (LECs), flash lamps, antennas, and the like. In some cases, radiation detector 532 may be configured to detect light and/or radiation that has interacted directly or indirectly with at least a portion of at least an inspirate 508. Non-limiting examples of radiation detectors 532 include photodiodes, photodetectors, thermopiles, pyrolytic detectors, antennas, and the like. In some cases, a radiation amount detected by radiation detector 532 may be indicative of a concentration of a particular gas in at least a portion of at least an inspirate 508. For example, in some exemplary embodiments, radiation source 528 may include an infrared light source operating at a wavelength about 4.6 µm and radiation detector may include a photodiode sensitive over a range encompassing 4.6 µm. An exemplary infrared light source may include an LED comprising InAsSb/InAsSbP heterostructures, for example LED46 from Independent Business Scientific Group (IBSG) of Saint Petersburg, Russia. An exemplary infrared detector may include a mercury cadmium telluride photodiode, for example UM-I-6 HgCdTe from Boston Electronics of Brookline, Massachusetts. In some cases, an amount of radiation at least a specific wavelength absorbed, scatter, attenuated, and/or transmitted may be indicative of a gas concentration.

With continued reference to FIG. 5, in some cases, inspirate concentration sensor 520 may include an infrared point sensor. An infrared (IR) point sensor may use radiation passing through a known volume of gas, for example at least an inspirate 508. In some cases, detector 532 may be configured to detect radiation after passing through gas at a specific spectrum. As energy from infrared may be absorbed at certain wavelengths, depending on properties of at least an inspirate 520. For example, carbon monoxide absorbs wavelengths of about 4.2-4.5 µm. In some cases, detected radiation within a wavelength range may be compared to a wavelength outside of the wavelength range. A difference in detected radiation between these two wavelength ranges may be found to be proportional to a concentration of gas present. In some embodiments, an infrared image sensor may be used for active and/or passive imaging. For active sensing, radiation source 528 may include a coherent light source which may be scanned across a field of view of a scene and radiation detector 532 may be configured to detect backscattered light at an absorption wavelength of a specific target gas. In some cases, radiation detector 532 may include an image sensor, for example a two-dimensional array of radiation sensitive devices, for example arranged as pixels. Passive IR imaging sensors may measure spectral changes at each pixel in an image and look for specific spectral signatures that indicate presence and/or concentration of target gases.

With continued reference to FIG. 5, in some cases, inspirate gas concentration sensor 520 may include an oxygen sensor. An exemplary oxygen sensor may include an electro-galvanic sensor. For example, an electro-galvanic oxygen sensor may be used to measure a concentration of oxygen within at least an inspirate 508. In some cases, an electro-galvanic oxygen sensor may include a lead/oxygen galvanic cell, within which oxygen molecules are dissociated and reduced to hydroxyl ions at a cathode. Hydroxyl ions may diffuse through an electrolyte and oxidize a lead anode. A current proportional to a rate of oxygen consumption may be generated when cathode and anode are electrically connected through a resistor. Current may be sensed by known current sensing methods, for example without limitation those described in this disclosure, to produce an electrical signal proportional to a concentration of oxygen, for example oxygen within at least an inspirate. Another exemplary oxygen sensor may include a lambda sensor, for example a zirconia sensor, a wideband zirconia sensor, and/or a titania sensor. A lambda sensor may be configured to sense a quantity of oxygen in a gas such as at least an inspirate 508, relative another gas, for example air within an environment such as cabin air and transmit an analog voltage correlated to the sensed relative quantity of oxygen. Analog voltage transmitted by a lambda sensor may be processed by any data or signal processing methods discussed herein, for example through amplification and/or analog-to-digital conversion.

In another exemplary embodiment, inspirate concentration sensor 520 may include an optical sensor configured to sense oxygen concentration. In some cases, a chemical film is configured to be in contact with a gas. Chemical film may have fluorescence properties which are dependent upon presence and/or concentration of oxygen. Radiation detector 532 may be positioned and configured, such that it is in sensed communication with chemical film. Radiation source 528 may irradiate and/or illuminate chemical film with radiation and/or light having properties consistent with exciting fluorescence within the chemical film. For instance, in a non-limiting example, the properties may include wavelength, energy, pulse duration, and the like. In some cases, fluorescence may be at a maximum when there is no oxygen present. For example, oxygen molecules may collide with chemical film and quench photoluminescence resulting from fluorescent excitation. A number of $O_2$ molecules colliding with chemical film may be correlated with a concentration of oxygen within a gas. Fluorescence properties as sensed by optical detector 532 may therefore be related to oxygen concentration. Fluorescence properties may include emission duration, fluorescence energy, and the like. In some cases, detected optical signal (fluorescence) to oxygen concentration may not be linear. For instance, an optical oxygen sensor may be most sensitive at low oxygen concentration; that is, sensitivity decreases as oxygen concentration increases, following a known Stern-Volmer relationship. In some cases, an optical oxygen sensor is advantageous as substantially no oxygen may be consumed, during sensing. In some cases, planar optical oxygen sensors such as optodes may be used to detect a spatial distribution of oxygen concentrations over an area, for example as a two-dimensional image. Based on the same principle, radiation detector 532 may include a digital camera that may be used to capture fluorescence intensities over a specific area.

With continued reference to FIG. 5, inhalation sensor module 516 may include at least an inspirate pressure sensor 524, which is fluidic communication with at least an inspirate 508, for example by way of at least a fluidic channel 512. In some cases, at least an inspirate pressure sensor 516 may be configured to sense and transmit at least an inspirate pressure parameter as a function of a pressure of at least an inspirate 508. In some cases, inhalation pressure sensor 524 may include any type of pressure sensor described in this disclosure. Inhalation pressure sensor 524 may be a force collector type pressure sensor. Alternatively, in some case, inhalation pressure sensor 524 may be a pressure sensor type that does not use force collection. Further disclosure related to the inhalation sensor may be found in U.S. patent application Ser. No. 17/333,169, filed on May 28, 2021, entitled "SYSTEMS AND METHODS FOR INSPIRATE SENSING TO DETERMINE A PROBABILITY OF AN EMERGENT PHYSIOLOGICAL STATE," the entirety of which is incorporated herein by reference.

Figure 6:
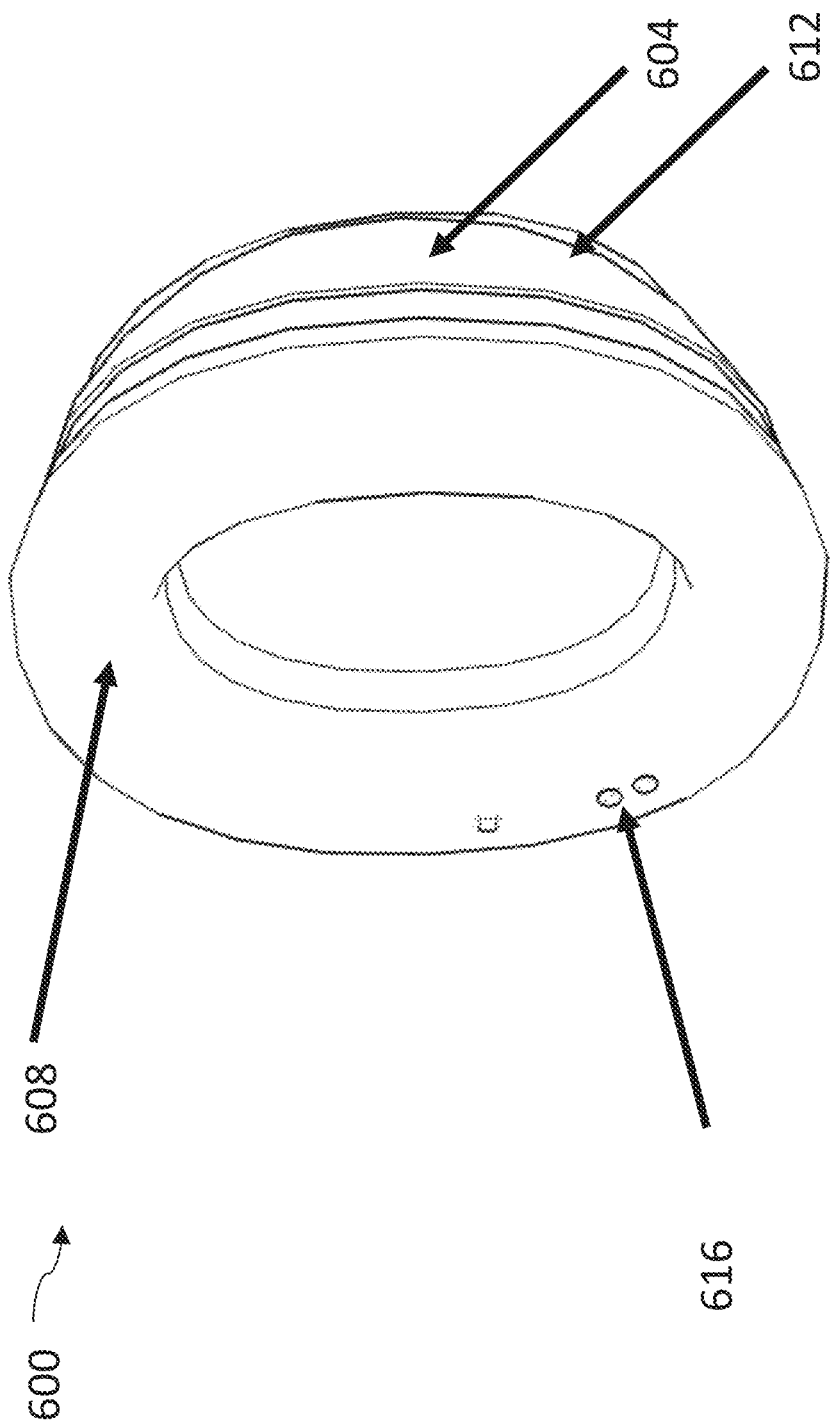
FIG. 6 is a schematic diagram illustrating an exemplary embodiment of a cutaneous sensor.

Referring now to FIG. 6, an exemplary embodiment of a headset 600 which may include a cutaneous sensor 616 is illustrated. In an embodiment, housing 604 may include a rigid outer shell 604. Rigid outer shell 604 may be configured to protect internal elements of headset 600 from damage and maintain them in a proper position on participant 140. Housing 204 may be inserted on a head of participant 140. In one embodiment, and without limitation, housing 204 may cover the ears of participant 140. As a non-limiting example, exterior body surface may be a surface, such as a surface of the head, face, or neck of user, which is wholly or partially covered by helmet, as described for example in further detail below. As a further non-limiting example, housing 604 may be formed to have a similar or identical shape to a standard-issue "ear cup" incorporated in an aviation helmet, so that housing 604 can replace ear cup 608 after ear cup 608 has been removed.

Continuing to refer to FIG. 6, cutaneous sensor 616 may further include a skin temperature sensor and a skin galvanic sensor. In one embodiment, cutaneous sensor 616 may be incorporated into an ear protection 608 of headset 600 such that cutaneous sensor 616 is positioned to make direct contact with a participant's skin just behind the ear at a local skeletal eminence. Cutaneous sensor 616 may additionally be connected electrically to another element within housing 604. In some embodiment, housing 604 including cutaneous sensor 616 such as the skin temperature sensor and the skin galvanic sensor may be mounted to an exterior body surface of a participant, wherein exterior body surface may include, without limitation, skin, hair, an interior surface of an orifice such as the mouth, nose, or ears, or the like. Exterior body surface and/or locus may include an exterior body surface of user's head, face, or neck. In another embodiment, cutaneous sensor 616 may be configured to contact a locus on the exterior body surface where substantially no muscle is located between the exterior body surface and an underlying bone structure. Location at a locus where muscle is not located between exterior body surface and underlying bone structure may decrease reading interference and/or inaccuracies created by movement and flexing of muscular tissue. In one embodiment, cutaneous sensor 616 may contact a locus having little or no hair on top of skin. In one embodiment, cutaneous sensor 116 may contact a locus near to a blood vessel, such as a locus where a large artery such as the carotid artery or a branch thereof, or a large vein such as the jugular vein, runs near to skin or bone at the location. In another embodiment, such a position may permit cutaneous sensor 616 to detect a participant's biometrics such as circulatory parameters.

Still referring to FIG. 6, seal 612 may be substantially pliable; seal 612 may be constructed of elastomeric, elastic, or flexible materials including without limitation flexible, elastomeric, or elastic rubber, plastic, silicone including medical grade silicone, gel, and the like. Substantially pliable seal 612 may include any combination of materials demonstrating flexible, elastomeric, or elastic properties, including without limitation foams covered with flexible membranes or sheets of polymer, leather, or textile material. As a non-limiting example, substantially pliable seal 612 may include any suitable pliable material for placement over a user's ear, including without limitation any pliable material or combination of materials suitable for use on headphones, headsets, earbuds, or the like. In an embodiment, substantially pliable seal 612 advantageously aids in maintaining ear cup 608 and/or other components of headset 600 against exterior body surface; for instance, where exterior body surface has elastomeric properties and may be expected to flex, stretch, or otherwise alter its shape or position to during operation, substantially pliable seal 612 may also stretch, flex, or otherwise alter its shape similarly under similar conditions. Seal 612 may be attached to housing 604 by any suitable means, including without limitation adhesion, fastening by stitching, stapling, or other penetrative means, snapping together or otherwise engaging interlocking parts, or the like. Seal 612 may be removably attached to ear cup 608, where removable attachment signifies attachment according to a process that permits repeated attachment and detachment without noticeable damage to housing 604 and/or seal 612, and without noticeable impairment of an ability to reattach again by the same process. As a non-limiting example, substantially pliable seal 612 may be placed on an ear cup of the housing 604. Further disclosure related to cutaneous sensor 616 may be found in U.S. patent application Ser. No. 17/892,542, filed on Aug. 22, 2022, entitled "SYSTEMS AND METHODS FOR CORRELATING CUTANEOUS ACTIVITY WITH HUMAN PERFORMANCE," the entirety of which is incorporated herein by reference.

Figure 7:
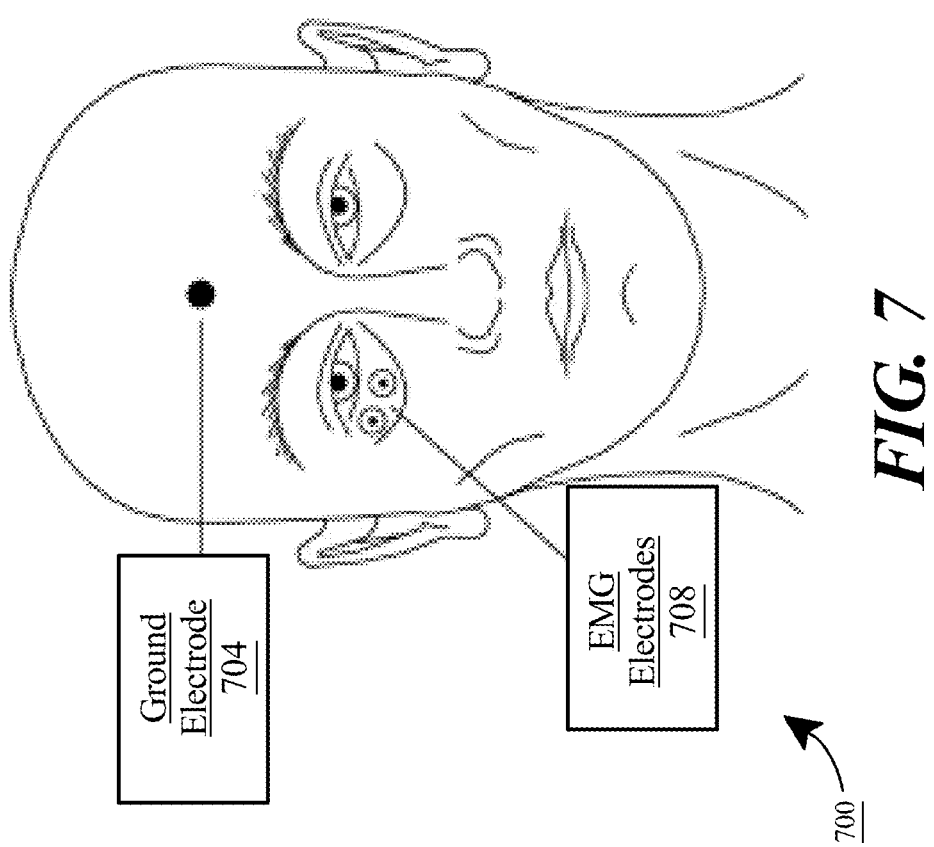
FIG. 7 is a diagram illustrating a placement of an electromyography sensor.

Referring now to FIG. 7, an exemplary placement of an EMG sensor 700 is illustrated. In some cases, EMG may be an electrodiagnostic medicine technique for evaluating and recording electrical activity produced by skeletal muscles. EMG may be performed using an instrument called an electromyograph to produce a record called an electromyogram. An electromyograph may detect electric potential generated by muscle cells, for instance when these cells are electrically or neurologically activated. Resulting electromyographic signals can be analyzed to detect medical abnormalities, activation level, or recruitment order, or to analyze the biomechanics of human or animal movement. In some cases, EMG may also be used as middleware in gesture recognition towards allowing input of physical action to a computing device or as a form of human-computer interaction. An EMG sensor 700 may include at least a ground electrode 704 and at least an EMG electrode 708. In some cases, a ground electrode 704 may be placed substantially away from an eye and/or extraocular muscles. In some cases, a ground electrode 704 may be electrically isolated, thereby allowing detection of muscular electrical activity relative the body rather than relative a ground or other reference. In some cases, EMG signals may be substantially made up of superimposed motor unit action potentials (MUAPs) from several motor units including muscles. EMG signals can be decomposed into their constituent MUAPs. MUAPs from different motor units tend to have different characteristic shapes, while MUAPs recorded by the same electrode from the same motor unit are typically similar. Notably MUAP size and shape depend on where the electrode is located with respect to muscle fibers and so can appear different if an electrode 704, 708 moves position. EMG decomposition may involve any signal processing methods described in this disclosure, including those below.

With continued reference to FIG. 7, in some case EMG signal rectification may include translation of a raw EMG signal to a signal with a single polarity, for instance positive. In some cases, rectifying an EMG signal may be performed to ensure the EMG signal does not average to zero, as commonly a raw EMG signal may have positive and negative components. According to some embodiments, substantially two types of EMG signal rectification may be used full-wave and half-wave rectification. As used in this disclosure, "full-wave rectification" may add EMG signal below a baseline to the EMG signal above the baseline, thereby resulting in a conditioned EMG signal that is all positive. For example, if baseline of EMG signal is zero, full-wave rectification would be equivalent to taking an absolute value of the EMG signal. According to some embodiments, full-wave rectification may conserve substantially all of EMG signal energy for analysis. As used in this disclosure, "half-wave rectification" discards a portion of EMG signal below baseline. As a result of half-wave rectification, average of EMG signal may no longer be zero; therefore, an EMG signal conditioned by half-wave rectification can be used in further statistical analyses.

Still referring to FIG. 7, in some embodiments, EMG sensor 700 may be used to detect a gaze of participant 140 and/or the gaze of participant 140 over time. As used in this disclosure, "gaze" is a direction participant 140 is looking. As used in this disclosure "gaze vector" is a directional vector having a point located at a participant's eye which represents a gaze of participant 140. In a non-limiting example, the participant's eye may include pupil, retina, or the like. In some cases, an EMG sensor 700 may be used to detect a gaze of participant 140 over time and this information may be used as input for one or more machine-learning models described herein. For example, in some cases, participant's whose gave is infrequently directed at interface 152 may be found to have a relatively lower confidence than those whose gaze is fixed on the interface 152. Alternatively or additionally, in some cases, participant's blink rate as detected by EMG sensor 700 may be used as an input for one or more machine-learning described herein as participant 140 who blink more frequently may be less trustworthy than those who blink less.

Still referring to FIG. 7, in some embodiments, similar gaze tracking and/or blink tracking functionality may be performed by using camera and machine vision software. An exemplary machine vision camera that may be included is an OpenMV Cam H7 from OpenMV, LLC of Atlanta, Georgia, U.S.A. OpenMV Cam comprises a small, low power, microcontroller which allows execution of machine vision applications. OpenMV Cam may comprise an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording. Further disclosure related to EMG sensor 700 may be found in U.S. patent application Ser. No. 17/731,935, filed on Apr. 28, 2022, entitled "SYSTEMS AND METHODS FOR DETERMINING ACTOR STATUS ACCORDING TO BEHAVIORAL PHENOMENA," the entirety of which is incorporated herein by reference.

Figure 8:
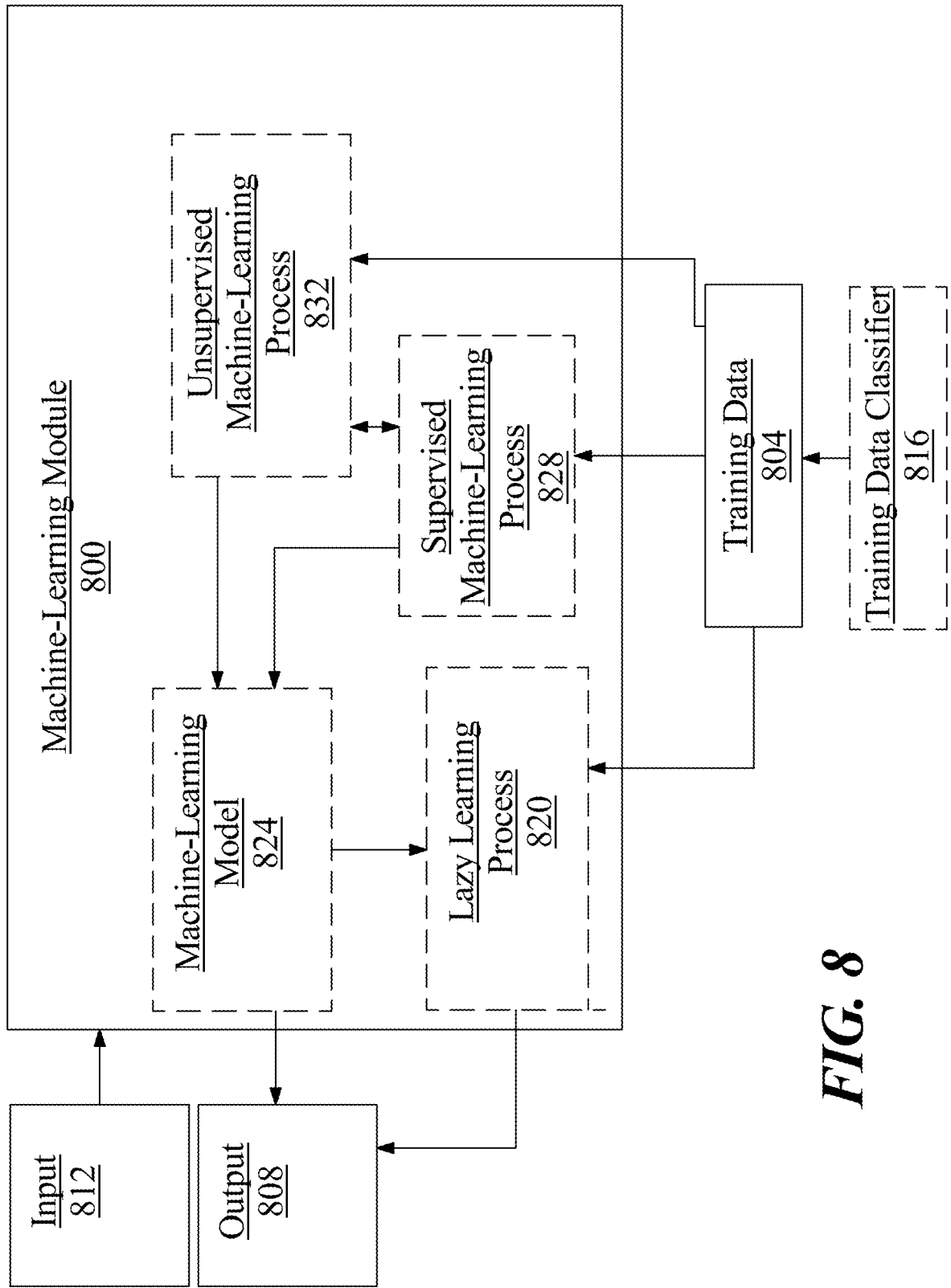
FIG. 8 is a block diagram of an exemplary embodiment of a machine-learning process.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 304 used by machine-learning module 300 may correlate any input data as described in this disclosure to any output data as described in this disclosure.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a process whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network including an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating several inputs to outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of one divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation such as a quadratic, cubic or higher-order equation providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 9:
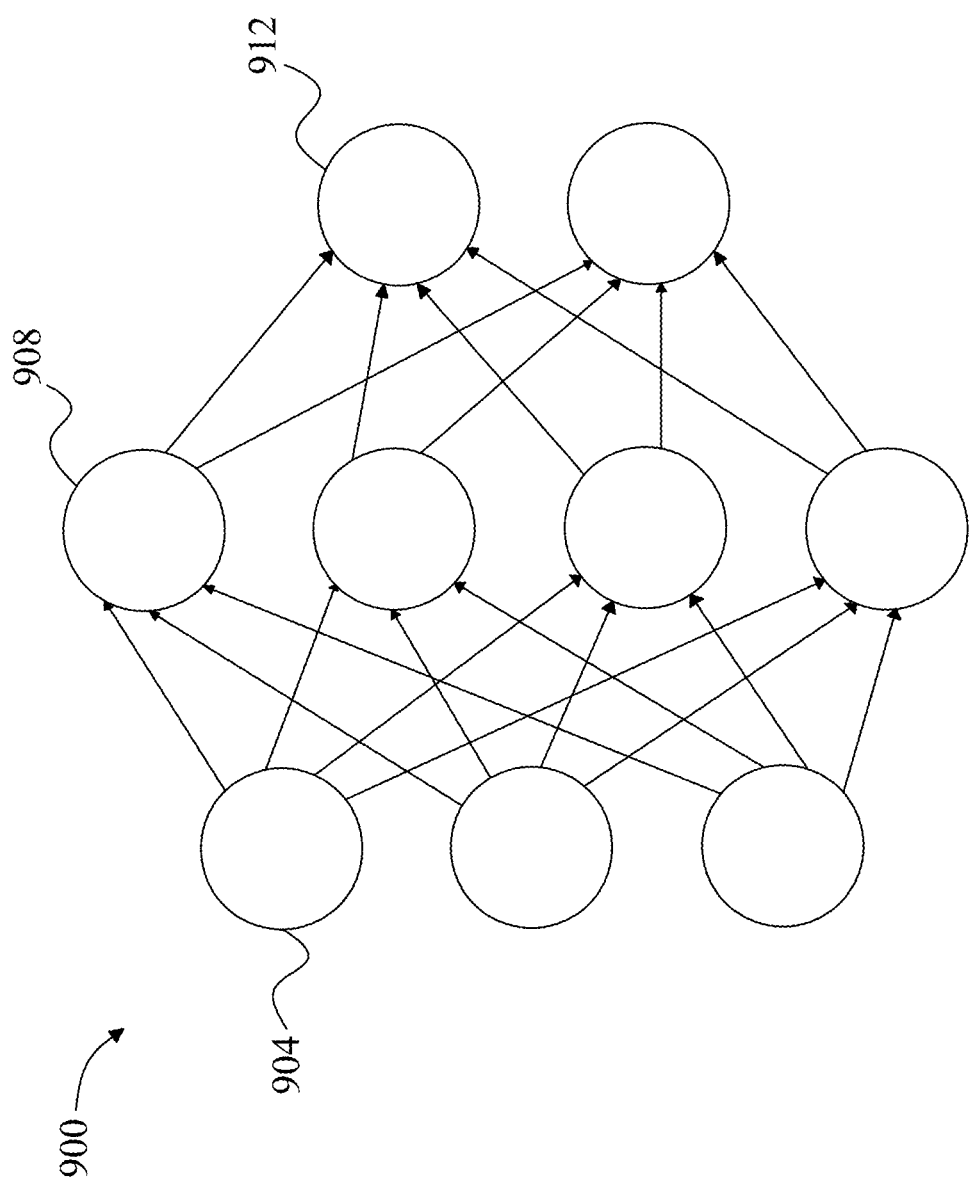
FIG. 9 is a schematic diagram of an exemplary embodiment of a neural network.

Referring now to FIG. 9, an exemplary embodiment of neural network 900 is illustrated. A neural network 900 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 904, one or more intermediate layers 908, and an output layer of nodes 912. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 10:
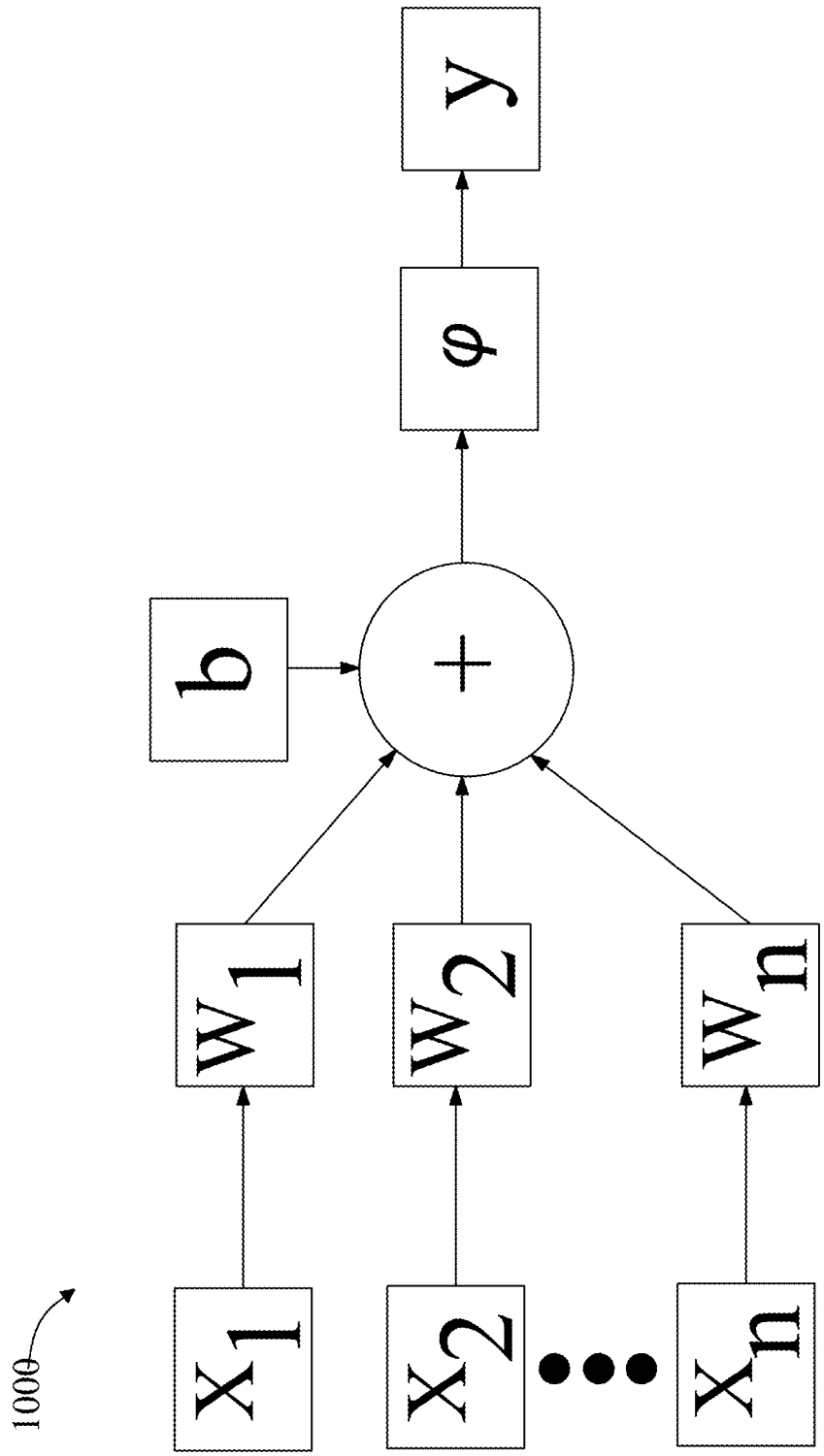
FIG. 10 is a schematic diagram of an exemplary embodiment of a node of a neural network.

Referring now to FIG. 10, an exemplary embodiment of a node 1000 of a neural network is illustrated. A node 1000 may include, without limitation, a plurality of inputs $x_i$ that may receive numerical values from inputs to a neural network containing the node and/or from other nodes. Node 1000 may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 11:
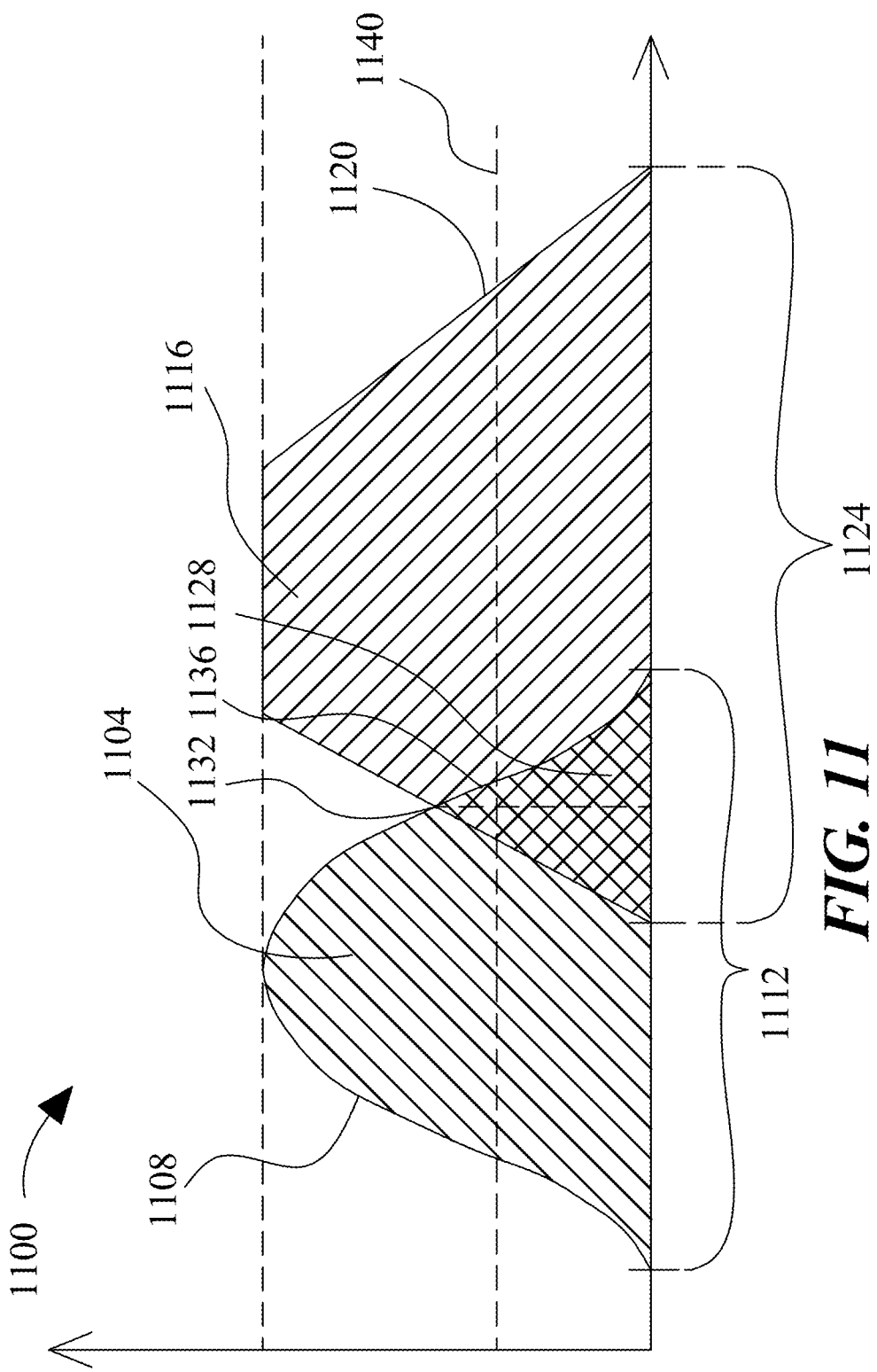
FIG. 11 is a graph representing an exemplary embodiment of a fuzzy set comparison.

Referring to FIG. 11, an exemplary embodiment of fuzzy set comparison 1100 is illustrated. A first fuzzy set 1104 may be represented, without limitation, according to a first membership function 1108 representing a probability that an input falling on a first range of values 1112 is a member of the first fuzzy set 1104, where the first membership function 1108 has values on a range of probabilities such as without limitation the interval [0,1], and an area beneath the first membership function 1108 may represent a set of values within first fuzzy set 1104. Although first range of values 1112 is illustrated for clarity in this exemplary depiction as a range on a single number line or axis, first range of values 1112 may be defined on two or more dimensions, representing, for instance, a Cartesian product between a plurality of ranges, curves, axes, spaces, dimensions, or the like. First membership function 1108 may include any suitable function mapping first range 1112 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 11, first fuzzy set 1104 may represent any value or combination of values as described above, including output from one or more machine-learning models and signals 120 from sensor 116, a predetermined class, such as without limitation a participant trustworthiness 136. Participant trustworthiness 136, in a non-limiting example, may include honest, dishonest, or the like. A second fuzzy set 1116, which may represent any value which may be represented by first fuzzy set 1104, may be defined by a second membership function 1120 on a second range 1124; second range 1124 may be identical and/or overlap with first range 1112 and/or may be combined with first range via Cartesian product or the like to generate a mapping permitting evaluation overlap of first fuzzy set 1104 and second fuzzy set 1116. Where first fuzzy set 1104 and second fuzzy set 1116 have a region 1128 that overlaps, first membership function 1108 and second membership function 1120 may intersect at a point 1132 representing a probability, as defined on probability interval, of a match between first fuzzy set 1104 and second fuzzy set 1116. Alternatively or additionally, a single value of first and/or second fuzzy set may be located at a locus 1136 on first range 1112 and/or second range 1124, where a probability of membership may be taken by evaluation of first membership function 1108 and/or second membership function 1120 at that range point. A probability at 1128 and/or 1132 may be compared to a threshold 1140 to determine whether a positive match is indicated. Threshold 1140 may, in a non-limiting example, represent a degree of match between first fuzzy set 1104 and second fuzzy set 1116, and/or single values therein with each other or with either set, which is sufficient for purposes of the matching process; for instance, threshold may indicate a sufficient degree of overlap between an output from one or more machine-learning models and/or a signal 120 and a predetermined class, such as without limitation a participant trustworthiness 136, for combination to occur as described above. Alternatively or additionally, each threshold may be tuned by a machine-learning and/or statistical process, for instance and without limitation as described in further detail below.

Further referring to FIG. 11, in an embodiment, a degree of match between fuzzy sets may be used to classify signal 120 with participant trustworthiness 136. For instance, if a biofeedback signal has a fuzzy set matching participant trustworthiness 136 fuzzy set by having a degree of overlap exceeding a threshold, processor 108 may classify the biofeedback signal as honest for participant trustworthiness. Where multiple fuzzy matches are performed, degrees of match for each respective fuzzy set may be computed and aggregated through, for instance, addition, averaging, or the like, to determine an overall degree of match.

Still referring to FIG. 11, in an embodiment, signal 120 may be compared to multiple participant trustworthiness 136 fuzzy sets. For instance, a visible feedback signal may be represented by a fuzzy set that is compared to each of the multiple participant trustworthiness 136 fuzzy sets; and a degree of overlap exceeding a threshold between the visible feedback signal fuzzy set and any of the multiple participant trustworthiness 136 fuzzy sets may cause processor 108 to classify the visible feedback signal as belonging to participant trustworthiness as dishonest. For instance, in one embodiment there may be two participant trustworthiness fuzzy sets, representing honest and dishonest respectively. Honest may have an honest state fuzzy set; dishonest may have a dishonest state fuzzy set; and the visible feedback signal of signals 120 may have a visible feedback signal fuzzy set. Processor 108, for example, may compare the visible feedback signal fuzzy set with each of honest state fuzzy set and dishonest state fuzzy set, as described above, and classify a visible feedback fuzzy set to either, both, or neither of honest state nor dishonest state. Machine-learning methods as described throughout may, in a non-limiting example, generate coefficients used in fuzzy set equations as described above, such as without limitation x, c, and σ of a Gaussian set as described above, as outputs of machine-learning methods. Likewise, signals 120 may be used indirectly to determine a fuzzy set, as a visible feedback signal fuzzy set may be derived from outputs of one or more machine-learning models that take the visible feedback signal fuzzy set directly or indirectly as inputs.

Figure 12:
FIG. 12 is a flow diagram of an exemplary method for monitoring human trustworthiness.

Referring now to FIG. 12, a flow diagram of an exemplary method 1200 for monitoring human trustworthiness is illustrated. At step 1205, method 1200 includes facilitating, by at least an interface, telecommunication for a participant. In some embodiments, telecommunication may include the exchange of information over significant distances by electronic means which may include all types of voice, data, and/or video transmission such as teleconference using a wide range of information-transmitting technologies and communications infrastructures, such as wire phones, mobile devices, microwave communications, fiber optics, satellites, radio and television broadcasting, internet, and telegraphs. This may be implemented as described and with reference to FIGS. 1-11.

Still referring to FIG. 12, at step 1210, method 1200 includes detecting, by a plurality of sensors, a plurality of signals from the participant. In some embodiments, the plurality of sensors may be configured to detect signals related to biofeedback, visible feedback, auditory feedback, and the like. In some embodiments, the plurality of sensors may include at least a NIRS, an exhalation sensor, an inhalation sensor, a cutaneous sensor, a speech sensor, and an eye movement sensor. This may be implemented as described and with reference to FIGS. 1-11.

Continuing to refer to FIG. 12, at step 1215, method 1200 includes receiving, by at least a processor, the plurality of signals. In one embodiment, the plurality of signals is stored in a data store such as, with no limitation, a database. This may be implemented as described and with reference to FIGS. 1-11.

Still referring to FIG. 12, at step 1220, method 1200 includes generating, by the at least a processor, a participant trustworthiness classifier as a function of a participant trustworthiness machine-learning algorithm. This may be implemented as described and with reference to FIGS. 1-11.

Still referring to FIG. 12, at step 1225, method 1200 includes training, by the at least a processor, the participant trustworthiness classifier using at least a training sample, wherein the at least a training sample correlates the plurality of signals to responses of known trustworthiness. In one embodiment, the machine-learning process may be trained using the participant's biometrics. In one embodiment, the machine-learning process may be trained using biometrics from the participant's interlocutor. In one embodiment, the machine-learning process may be trained using what can be seen and heard in the telecommunication. In one embodiment, the machine-learning process may be trained in accordance with responses to questions with known correct/incorrect answers provided by the participant. This may be implemented as described and with reference to FIGS. 1-11.

Continuing to refer to FIG. 12, at step 1230, method 1200 includes generating, by the at least a processor, a participant trustworthiness as a function of the participant trustworthiness classifier. In some embodiments, a confidence metric associated with the participant trustworthiness may be created by the at least a processor. This may be implemented as described and with reference to FIGS. 1-11.

It is to be noted that any one or more of the aspects and embodiments described herein may be conveniently implemented using one or more machines (e.g., one or more computing devices that are utilized for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
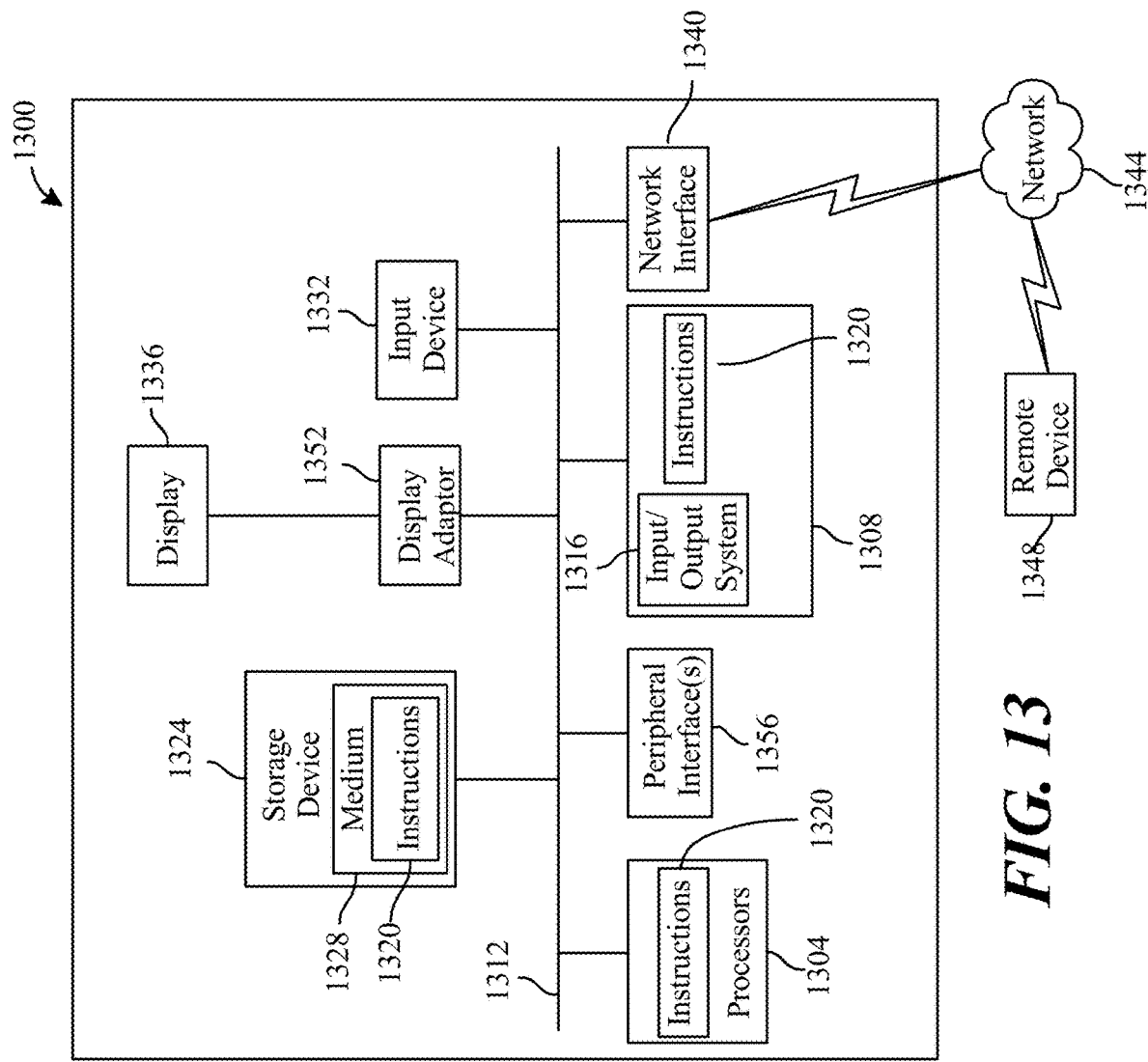
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for monitoring human trustworthiness, the apparatus comprising:
    at least an interface configured to facilitate telecommunication for a participant;
    a plurality of sensors configured to detect a plurality of signals from the participant;
    at least a computing device comprising:
        at least a processor; and
        a memory communicatively connected to the at least a processor, wherein the memory contains instructions configuring the at least a processor to:
            receive the plurality of signals from the plurality of sensors;
            generate a participant trustworthiness classifier as a function of a participant trustworthiness machine-learning algorithm;
            train the participant trustworthiness classifier using at least a training sample, wherein the at least a training sample correlates the plurality of signals to responses of known trustworthiness,
            wherein:
                training the participant trustworthiness classifier further comprises using a plurality of biofeedback signals collected from an interlocutor of the participant as the at least a training sample; and
                the at least a training sample correlates the plurality of biofeedback signals collected from the interlocutor of the participant to responses of known trustworthiness; and
            determine a participant trustworthiness as a function of the participant trustworthiness classifier.

2. The apparatus of claim 1, wherein the plurality of sensors is configured to detect biofeedback signals from the participant.

3. The apparatus of claim 1, wherein the plurality of sensors is configured to detect visible feedback signals and auditory feedback signals from the participant.

4. The apparatus of claim 2, wherein the plurality of sensors comprises at least a near-infrared (NIR) spectroscopy sensor.

5. The apparatus of claim 3, wherein the plurality of sensors comprises at least a speech sensor; and wherein the at least a speech sensor is configured to detect the auditory feedback signals in a teleconference.

6. The apparatus of claim 3, wherein the plurality of sensors comprises at least an eye movement sensor and at least a body movement sensor; and wherein the at least an eye movement sensor and the at least a body movement sensor are configured to detect the visible feedback signals in a teleconference.

7. The apparatus of claim 1, wherein the memory contains instructions further configuring the at least a processor to determine at least an eye pattern using a machine learning model; and wherein the machine learning model is trained by using at least an eye pattern training data correlating at least an eye parameter to an eye pattern.

8. The apparatus of claim 1, wherein the memory contains instructions further configuring the at least a processor to determine at least a speech pattern using a machine learning model; and wherein the machine learning model is trained by using at least a speech pattern training data correlating at least a speech parameter to a speech pattern.

9. The apparatus of claim 1, wherein the memory contains instructions further configuring the at least a processor to generate a confidence metric associated with the participant trustworthiness.

10. A method for monitoring human trustworthiness, the method comprising:

facilitating, by at least an interface, telecommunication for a participant;

detecting, by a plurality of sensors, a plurality of signals from the participant;

receiving, by at least a processor, the plurality of signals from the plurality of sensors;

generating, by the at least a processor, a participant trustworthiness classifier as a function of a participant trustworthiness machine-learning algorithm;

training, by the at least a processor, the participant trustworthiness classifier using at least a training sample, wherein the at least a training sample correlates the plurality of signals to responses of known trustworthiness, wherein:

training the participant trustworthiness classifier further comprises using a plurality of biofeedback signals collected from an interlocutor of the participant as the at least a training sample; and the at least a training sample correlates the plurality of biofeedback signals collected from the interlocutor of the participant to responses of known trustworthiness; and determining, by the at least a processor, a participant trustworthiness as a function of the participant trustworthiness classifier.

11. The method of claim 10, wherein the plurality of sensors is configured to detect biofeedback signals from the participant.

12. The method of claim 10, wherein the plurality of sensors is configured to detect visible feedback signals and auditory feedback signals from the participant.

13. The method of claim 12, wherein the plurality of sensors comprises at least a speech sensor; and wherein the at least a speech sensor is configured to detect the auditory feedback signals in a teleconference.

14. The method of claim 12, wherein the plurality of sensors comprises at least an eye movement sensor and at least a body movement sensor; and wherein the at least an eye movement sensor and the at least a body movement sensor are configured to detect the visible feedback signals in a teleconference.

15. The method of claim 10, wherein the plurality of sensors comprises a near-infrared (NIR) spectroscopy sensor.

16. The method of claim 10, further comprising determining, by the at least a processor, at least an eye pattern using a machine learning model; and wherein the machine learning model is trained by using at least an eye pattern training data correlating at least an eye parameter to an eye pattern.

17. The method of claim 10, further comprising determining, by the at least a processor, at least a speech pattern using a machine learning model; and wherein the machine learning model is trained by using at least a speech pattern training datum correlating at least a speech parameter to a speech pattern.

18. The method of claim 10, further comprising generating, by the at least a processor, a confidence metric associated with the participant trustworthiness.

* * * * *